US011149125B2

(12) United States Patent
Aspin et al.

(10) Patent No.: US 11,149,125 B2
(45) Date of Patent: Oct. 19, 2021

(54) FAST-CURE PRE-PREG

(71) Applicant: CYTEC INDUSTRIES INC., Princeton, NJ (US)

(72) Inventors: Ian Paul Aspin, Derbyshire (GB); Andrew Steven Gibbs, Chesterfield (GB); Oliver James Nicks, Heanor (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 556 days.

(21) Appl. No.: 16/312,863

(22) PCT Filed: Aug. 12, 2016

(86) PCT No.: PCT/US2016/046861
§ 371 (c)(1),
(2) Date: Dec. 21, 2018

(87) PCT Pub. No.: WO2017/030988
PCT Pub. Date: Feb. 23, 2017

(65) Prior Publication Data
US 2019/0256676 A1 Aug. 22, 2019

(30) Foreign Application Priority Data

Aug. 14, 2015 (GB) ..................... 1514516

(51) Int. Cl.
*C08J 5/24* (2006.01)
*C08J 5/04* (2006.01)
(Continued)

(52) U.S. Cl.
CPC ............ *C08J 5/24* (2013.01); *C08G 59/5006* (2013.01); *C08G 59/5073* (2013.01);
(Continued)

(58) Field of Classification Search
None
See application file for complete search history.

(56) References Cited

U.S. PATENT DOCUMENTS 4,912,190 A * 3/1990 Schafer .............. C08G 59/4014
528/102
7,008,555 B2 * 3/2006 Hayes ................ C08G 59/5033
252/182.13

(Continued)

FOREIGN PATENT DOCUMENTS

FR    2404018 A1    4/1979
JP    S5578013 A    6/1980

(Continued)

OTHER PUBLICATIONS

International Search Report dated Nov. 11, 2016, PCT/US2016/046861 (14 pages).

*Primary Examiner* — Joseph D Anthony
(74) *Attorney, Agent, or Firm* — Thi D. Dang

(57) ABSTRACT

A laminar pre-preg of fibre-reinforced curable composite material. The pre-preg includes at least one layer of reinforcing fibres impregnated with a curable resin containing one or more curable thermosetting resin(s) and at least one liquid curative, wherein the curable resin exhibits a cure conversion of at least 95% when cured at a cure temperature in the range of from about 100° C. to about 160° C. and the cure cycle has a duration of no more than 10 minutes, and the glass transition temperature (Tg) of the curable resin when cured is in the range of from about 130° C. to about 165° C.

14 Claims, 9 Drawing Sheets

(51) Int. Cl.
*C08G 59/50* (2006.01)
*C08G 59/22* (2006.01)

(52) U.S. Cl.
CPC ............... *C08J 5/042* (2013.01); *C08J 5/043* (2013.01); *C08G 59/226* (2013.01); *C08J 2363/00* (2013.01); *C08J 2363/04* (2013.01)

(56) References Cited

U.S. PATENT DOCUMENTS

| | | | | |
|---|---|---|---|---|
| 7,754,322 B2* | 7/2010 | Tilbrook | .................. | C08L 63/00 428/297.4 |
| 2004/0242836 A1* | 12/2004 | Hayes | ................ | C08G 59/5033 528/124 |
| 2008/0081170 A1* | 4/2008 | Tilbrook | ............ | C08G 59/5033 428/292.1 |
| 2009/0311535 A1* | 12/2009 | Tilbrook | ................. | C08L 63/00 428/417 |
| 2011/0147670 A1* | 6/2011 | Tilbrook | ............ | C08G 59/5033 252/503 |
| 2011/0259514 A1* | 10/2011 | Boyle | ..................... | C08L 63/00 156/276 |
| 2011/0262630 A1* | 10/2011 | Tilbrook | ................... | C08J 5/24 427/121 |
| 2014/0288214 A1* | 9/2014 | Oka | .................... | C08G 59/686 523/468 |
| 2015/0158970 A1* | 6/2015 | Strobel | .............. | C08G 59/4014 523/400 |
| 2015/0252160 A1* | 9/2015 | Teranishi | ................... | C08J 5/24 428/413 |
| 2015/0322257 A1* | 11/2015 | Hirano | ................. | C08G 59/688 428/414 |
| 2016/0083543 A1* | 3/2016 | Spencer | ................... | C08J 5/042 523/466 |
| 2016/0237273 A1* | 8/2016 | Oka | ................... | C08G 59/4284 |

FOREIGN PATENT DOCUMENTS

| | | |
|---|---|---|
| JP | 2000212249 A | 8/2000 |
| JP | 2005132857 A | 5/2005 |
| JP | 2008038082 A | 2/2008 |
| WO | 2015011297 A1 | 1/2015 |

* cited by examiner

FAST-CURE PRE-PREG

CROSS-REFERENCE TO RELATED APPLICATIONS

The present application is a U.S. national phase entry under 35 U.S.C. § 371 of International Application No. PCT/US2016/046861, filed on 12 Aug. 2016, which claims priority to UK Application No. 1514516.2, filed 14 Aug. 2015, the entire content of each of these applications is explicitly incorporated herein by reference.

The present invention relates to rapid-curing resin formulations and fibre-reinforced composite materials comprising said rapid-curing resin formulations, and their use in the manufacture of moulded articles, particularly wherein the manufacturing process requires high throughput. The present invention further relates to a manufacturing process for preparing an article, particularly a moulded article, from a fibre-reinforced composite material comprising a rapid-curing resin formulation.

Typically, the manufacture of cured composite articles from pre-pregs is a relatively lengthy process. The curing of the material is often the major contributor to the total time taken. A conventional pre-preg is often cured in either an autoclave or an oven, and in such a scenario it is normal for the cure cycle to begin with a temperature ramp from ambient temperature up to the desired cure temperature. The rate at which the temperature is ramped is typically 1-2° C./min and the final curing temperature is often in the range of from about 120 to about 180° C. The hold time at the final cure temperature is usually about 1 to 2 hours, which is then followed by a cooling step to cool the cured resin down to about 60° C. or less at a rate of 2-3° C./min. The total duration of the cure cycle is typically therefore in the range of 2 to 6 hours.

For the manufacture of composite articles where a high throughput is required (for example, serial automotive and sports/leisure goods), such lengthy cure cycles are inefficient and economically unviable. Instead, short cure cycles in a press moulding process are typically preferred, where the press moulding process allows for the pre-preg to be loaded into a tool pre-heated to the curing temperature and after a short cure-time the moulded composite article is then removed hot (i.e. whilst still at the curing temperature). To allow curing of pre-pregs in this way, the curable resin must be capable of curing within a short length of time, for instance no more than 10 minutes.

Fast-curing resin formulations are known in the art. For instance, WO-2014/096435-A and EP-1279688-A both describe fast curing epoxy formulations. In both cases, however, the formulations comprise solid curatives in particulate or powder form. However, the present inventors have identified a problem with such resin formulations in composite materials comprising fibrous reinforcement. In particular, the present inventors observed that pre-pregs comprising a curable resin containing only solid curatives exhibit inferior development of glass transition temperature (Tg) in the curing process, particularly when cured using short cure cycles in a press-moulding process. An inferior Tg is undesirable and disadvantageous because it limits the suitability of the moulded article in applications where the article is expected to work at elevated temperatures. An inferior Tg also increases the likelihood that the moulded part becomes distorted when removing it from the hot mould, since the risk of distortion is much greater when demoulding a cured composite article at a temperature above its Tg.

The present invention advantageously addresses these problems.

According to a first aspect of the present invention, there is provided a laminar pre-preg of fibre-reinforced curable composite material, wherein said pre-preg comprises at least one layer of reinforcing fibres impregnated with a curable resin comprising one or more curable thermosetting resin(s), wherein:

(i) the curable resin comprises at least one liquid curative;
(ii) the curable resin exhibits a cure conversion of at least 95% when cured at a cure temperature in the range of from about 100° C. to about 160° C. wherein the cure cycle has a duration of no more than 10 minutes; and
(iii) the glass transition temperature (Tg) of the curable resin when cured is in the range of from about 130° C. to about 165° C.

According to a second aspect of the invention, there is provided a resin formulation comprising a curable resin comprising one or more curable thermosetting resin(s) and at least one liquid curative wherein:

(i) the curable resin exhibits a cure conversion of at least 95% when cured at a cure temperature in the range of from about 100° C. to about 160° C. wherein the cure cycle has a duration of no more than 10 minutes; and
(ii) the glass transition temperature (Tg) of the curable resin when cured is in the range of from about 130° C. to about 165° C.

The resin formulations and pre-pregs of the present invention exhibit superior glass transition temperature (Tg) development in the curing process, particularly when cured using short cure cycles in a press-moulding process. Without wishing to be bound by theory, the inventors consider that the inferior Tg development during curing is a consequence of the solid curatives being filtered by the fibres of the fibrous reinforcement in such a way that the curative is unable to enter or penetrate the centre of the fibre bundle. The inventors' observation is referred to herein as "curative filtration". The larger the fibre bundle, the larger the effect is.

Curative filtration is a particular problem for moulded articles prepared using relatively heavy or thick pre-pregs comprising relatively heavy (e.g. "industrial-grade") fibrous reinforcement or fabric. Such heavier or thicker pre-pregs are particularly preferred in the manufacture of moulded articles at high throughput, because such pre-pregs allow for the faster deposition rates that are required to support the high throughput. Additionally, the relatively heavy or thick pre-pregs made from relatively heavy fabrics tend to be less expensive, which is an important consideration for high-throughout, high-volume articles.

The laminar pre-preg of the present invention comprises or consists of one or more layer(s) of reinforcing fibres impregnated with a curable resin. Preferably, the layer(s) of reinforcing fibres are impregnated with said curable resin. As used herein, the term "impregnated" means that the curable resin is present throughout the cross-section of the laminar prepreg, i.e. the curable resin is present in interstices between the reinforcing fibres or bundles of reinforcing fibres throughout the cross-section of the laminar prepreg.

The fibres in a reinforcing fibre layer are preferably in the form of continuous fibres, filaments, tows, bundles, sheets, plies, or combinations thereof. The precise specification of the fibres, for instance their orientation and/or density can be specified to achieve the optimum performance for the intended use of the pre-pregs. Continuous fibres may adopt any of unidirectional (aligned in one direction), multi-directional (aligned in different directions), non-woven, woven, knitted, stitched, wound, and braided configurations.

Woven fibre structures may comprise a plurality of woven tows, each tow composed of a plurality of filaments, e.g. thousands of filaments. In further embodiments, the tows may be held in position by cross-tow stitches, weft-insertion knitting stitches, or a small amount of resin binder, such as a thermoplastic resin. In one preferred embodiment, the layer(s) of reinforcing fibres used in the present invention comprise woven fibre structures comprising a plurality of woven tows arranged substantially orthogonally. In a further preferred embodiment, the layer(s) of reinforcing fibres used in the present invention comprise fibre structures wherein the fibres are arranged unidirectionally. In a further preferred embodiment, the layer(s) of reinforcing fibres used in the present invention comprise fibre structures wherein the fibres are arranged in other orientations, such as tri-axial wherein fibres are arranged in three directions, such as 0°, +60°, −60°.

The reinforcing fibres are preferably selected from, but not limited to, fibres of glass (including Electrical or E-glass), carbon (particularly graphite), aramid, polyamide, high-modulus polyethylene (PE), polyester, poly-p-phenylene-benzoxazole (PBO), boron, quartz, basalt, ceramic, and combinations thereof. Carbon fibre is particularly suitable. For the fabrication of high-strength composite materials, e.g. for aerospace and automotive applications, it is preferred that the reinforcing fibres have a tensile strength of greater than 3500 MPa.

Preferably, the reinforcing fibres exhibit a tow size of at least 12,000 filaments per tow (conventionally referred to in the art as 12k), and in this embodiment the reinforcing fibres are preferably carbon fibre. In an alternative embodiment, the reinforcing fibres are glass and exhibit a roving or yarn with a tex of at least 68, preferably with a tex of at least 136.

Preferably, the at least one layer of reinforcing fibres is a fabric which exhibits an areal weight of at least about 300 g/m² (or gsm) and preferably wherein the reinforcing fibres are carbon fibre and exhibit a tow size of at least 12,000 filaments per tow.

Preferably, the reinforcing fibres are continuous filaments, preferably wherein said reinforcing fibres are in the form of untwisted bundles of continuous filaments.

Suitable industrial fabrics having an areal weight of at least 300 gsm made from carbon fibre with a tow size of at least 12k include the following, non-limiting examples:

400 gsm 2×2 twill made from T700SC-12k-60E (commercially available from Toray);

660 gsm 2×2 twill made from T700SC-12k-60E (commercially available from Toray);

400 gsm±45° (0/90° NCF (non-crimp fabric) made from STS40-F13-24k (commercially available from Toho Tenax®);

600 gsm±45° (0/90° NCF (non-crimp fabric) made from STS40-F13-24k (commercially available from Toho Tenax®);

600 gsm+45/0/−45° triaxial NCF (non-crimp fabric) made from STS40-F13-24k (commercially available from Toho Tenax®);

400 gsm±45° (0/90° NCF (non-crimp fabric) made from Panex 35-48K (commercially available from Zoltek); and 600 gsm±45° (0/90° NCF (non-crimp fabric) made from Panex 35-48K (commercially available from Zoltek).

Suitable industrial fabrics having an areal weight of at least 300 gsm made from glass fibre include the following, non-limiting example:

600 gsm)±45° (0/90° NCF (non-crimp fabric) made from 600 tex E-glass (commercially available from PPG fibre glass).

The curable resin comprises one or more curable thermosetting resin(s). The formulation of the curable resin can be specified to achieve the optimum performance for the intended use of the pre-pregs. Curable resins suitable for use in the present invention are preferably selected from the group consisting of epoxy resins and resins comprising vinyl groups such as vinyl ester resins, and mixtures thereof. Preferably the curable resin is selected from epoxy resins. An epoxy resin is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof.

The particularly preferred epoxy resins may be monofunctional, difunctional, or multifunctional epoxy resins. As used herein, the term "multifunctional" epoxy resin is a resin which has a functionality of greater than two. Preferred multifunctional resins are at least trifunctional, typically trifunctional or tetrafunctional, although epoxy resins having greater functionality may also be used, for instance those having 5 or 6 epoxy groups. The term "multi-functional" encompasses resins which have non-integer functionality, for instance epoxy phenol novolac (EPN) resins, as known in the art. The epoxy resin may comprise monofunctional, difunctional and/or multifunctional (typically trifunctional or tetrafunctional) epoxy resins. In a preferred embodiment, the curable resin comprises one or more multifunctional epoxy resin(s) (typically trifunctional and/or tetrafunctional). Preferably the curable resin comprises one or more multifunctional (typically trifunctional or tetrafunctional) epoxy resin(s)) optionally in combination with one or more difunctional epoxy resin(s) (and preferably at least two difunctional epoxy resin(s)). In a preferred embodiment, the curable resin comprises one or more trifunctional epoxy resin(s) and/or one or more tetrafunctional epoxy resin(s) optionally in combination with one or more difunctional epoxy resin(s) (and preferably at least two difunctional epoxy resin(s)).

Suitable difunctional epoxy resins include those based on: diglycidyl ether of Bisphenol F, Bisphenol A (optionally brominated), glycidyl ethers of phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. Difunctional epoxy resins are preferably selected from diglycidyl ether of Bisphenol F (DGEBF), diglycidyl ether of Bisphenol A (DGEBA), diglycidyl ether of dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenols, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl diamino diphenylmethane (TGDDM) and N,N,N',N'-tetraglycidyl-m-xylenediamine.

In a preferred embodiment, the curable resin is selected from curable resins which comprise:
- (i) an epoxy phenol novolac (EPN) resin;
- (ii) an epoxy cresol novolac (ECN) resin;
  optionally in combination with one or more of epoxy resin(s) selected from:
- (iii) a first difunctional epoxy resin, preferably selected from bisphenol A epoxy resins, and preferably DGEBA; and/or
- (iv) a second difunctional epoxy resin, preferably selected from bisphenol F epoxy resins, and preferably DGEBF.

In a preferred embodiment, the curable resin is selected from curable resins which comprise
- (i) a trifunctional epoxy resin, preferably triglycidyl aminophenol, preferably triglycidyl para-aminophenol (TGPAP); and/or
- (ii) a tetrafunctional epoxy resin, preferably tetraglycidyl diamino diphenyl methane (TGDDM);
  in combination with one or more of epoxy resin(s) selected from:
- (iii) a first difunctional epoxy resin, preferably selected from bisphenol A epoxy resins, and preferably DGEBA; and/or
- (iv) a second difunctional epoxy resin, preferably selected from bisphenol F epoxy resins, and preferably DGEBF.

Thus, an epoxy resin may be selected from N,N,N',N'-tetraglycidyl diamino diphenylmethane (e.g. grades MY 9663, MY 720 or MY 721; Huntsman); N,N,N',N'-tetraglycidyl-bis(4-aminophenyl)-1,4-diiso-propylbenzene (e.g. EPON 1071; Hexion); N,N,N',N'-tetraglycidyl-bis(4-amino-3,5-dimethylphenyl)-1,4-diisopropylbenzene, (e.g. EPON 1072; Hexion); triglycidyl ethers of p-aminophenol (e.g. MY 0510; Hunstman); diglycidyl ethers of bisphenol A based materials such as 2,2-bis(4,4'-dihydroxy phenyl) propane (e.g. DE R 661 (Dow), or Epikote 828 (Hexion)) and higher molecular weight diglycidyl ethers of bisphenol A based materials such as those with an epoxy equivalent weight of 400-3500 g/mol (e.g. Epikote 1001 and Epikote 1009); glycidyl ethers of phenol novolak (or novolac) resins (e.g. DEN 431 or DEN 438; Dow); diglycidyl 1,2-phthalate (e.g. GLY CEL A-100); diglycidyl derivative of dihydroxy diphenyl methane (Bisphenol F) (e.g. PY 306; Hunstman). Other epoxy resin precursors include cycloaliphatics such as 3',4'-epoxycyclohexyl-3,4-epoxycyclohexane carboxylate (e.g. CY 179; Hunstman).

Preferably, the curable resin exhibits an EEW (epoxy equivalent weight) of at least about 190 g/mol, preferably at least about 200 g/mol, and typically no more than about 800 g/mol.

The curable resin comprises one or more liquid curative(s). Preferably, the liquid curative is selected from substituted imidazoles, preferably wherein the substituent groups of said substituted imidazoles are or comprise alkyl and/or aryl substituent groups, and preferably the liquid curative is selected from 1-cyanoethyl-2-ethyl-4-methylimidazole, 2-ethyl-4-methylimidazole, 1-cyanoethyl-2-methylimidazole, 1-methyl imidazole, 4-methyl imidazole, 1-benzyl-2-phenylimidazole, 1-benzyl-2-methylimidazole, 1-(3-aminopropyl)imidazole, 1,2-dimethylimidazole, 1-cyanoethyl-2-undecylimidazole, and 4,5-bis[(2-cyanoethoxy)methyl]-2-phenyl-1H-imidazole-1-propiononitrile.

Liquid curatives suitable for use in the present invention are preferably curatives which are liquid at a temperature in the range of from about −10° C. to about 90° C., preferably from about −10° C. to about 55° C., under atmospheric pressure. The liquid curatives are used in the liquid state and remain in the form of a liquid during and after combining with the other ingredients that form the curable resin, prior to curing.

The curable resin preferably comprises said liquid curative(s) in an amount of from about 0.1 wt % to about 20 wt %, preferably from about 1 wt % to about 10 wt % based on the total weight of the curable resin. Where the liquid curative is a substituted imidazole, the substituted imidazole is preferably present in an amount such that there is 1 mole of substituted imidazole per 10-25 moles, preferably per 17-22 moles, of epoxy groups.

The curable resin may optionally further comprise one or more solid curative(s), which are suitably present in particulate or powder form. Such solid curatives are well-known in the art. Suitable solid curatives include anhydrides (particularly poly carboxylic anhydrides) and amines (particularly aromatic amines and guanidine derivatives). Solid amine curatives suitably have molecular weights of up to 500 per amino group. Aromatic amines include, for example, 1,3-diaminobenzene, 4,4'-diaminodiphenylmethane. Other amine compounds of utility are the sulphones, e.g. 4,4'-diaminodiphenyl sulphone (4,4' DDS), and 3,3'-diaminodiphenyl sulphone (3,3' DDS). Other solid curatives include bis(4-amino-3,5-dimethylphenyl)-1,4-di isopropylbenzene (EPON 1062; Hexion); bis(4-aminophenyl)-1,4-diisopropylbenzene (EPON 1061; Hexion); 4-chlorophenyl-N,N-dimethyl-urea (e.g. Monuron); 3,4-dichlorophenyl-N,N-dimethyl-urea (e.g. Diuron™); 2,6 and 2,4 toluene bis dimethyl urea (Dyhard UR 500; Alzchem) and dicyandiamide (Dyhard 100S; Alzchem). Bisphenol chain extenders, such as bisphenol-S or thiodiphenol, are also particularly useful as solid curatives for epoxy resins. Dicyandiamide is of particular utility in the present invention.

Where one or more solid curative(s) is/are present, the curable resin comprises said solid curative in conventional amounts, and preferably in amounts of from about 1 wt % to about 20 wt %, preferably from about 2 wt % to about 10 wt %, based on the total weight of the curable resin.

As used herein, the term "curative" refers to any compound that effects, or assists in, the hardening of the curable resin, and hence the term "curative" includes catalysts, accelerators and hardeners (including stoichiometric hardeners).

The curable resin preferably further comprises one or more organic polybasic acid(s) and/organic polybasic acid anhydride(s), preferably wherein said organic polybasic acid is a di- or tri-carboxylic acid, preferably wherein said organic polybasic acid is succinic acid. Preferably, the pKa value of said organic polybasic acid is greater than 3. Preferably the curable resin comprises organic polybasic acid, rather than organic polybasic acid anhydride. The inclusion of such compounds has been found to increase ambient storage life with little or no detriment to reactivity (i.e. cure rate) at cure temperatures. The curable resin may comprise one or more of such compounds.

The curable resin preferably comprises said one or more organic polybasic acid(s) and/or anhydride(s) in an amount such that the curable resin comprises 1 mole of liquid curative (preferably said substituted imidazole(s)) per 0.5 to 1.5 mole of acid group of the organic polybasic acid or anhydride, and preferably about 1 mole liquid curative per 1 mole acid group of the organic polybasic acid or anhydride. Thus, preferably the molar ratio of liquid curative to acid group is from about 1:0.5 to 1:1.5, and preferably about 1:1. Thus, for a dibasic acid such as succinic acid, the molar ratio of liquid curative ((preferably said substituted imidazole(s)) to succinic acid is preferably from about 1:0.25 to about 1:0.75, and preferably about 1:0.5.

Preferably the curable resin comprises less than 30 parts, preferably less than 20 parts, preferably less than 10 parts, preferably less than 5 parts, preferably less than 2 parts of organic polybasic acid or anhydride per 100 parts of said one or more curable thermosetting resin(s).

The curable resin may further contain conventional additives, such as toughening agents, including particulate toughening agents, for instance aggregates such as glass beads, rubber particles and rubber-coated glass beads, filler such as polytetrafluoroethylene, silica, graphite, boron nitride, mica, talc and vermiculite, pigments, nucleating agents, flame retardants such as alumina trihydrate (ATH) and magnesium hydroxide (MDH), and stabilisers such as phosphates. Core-shell rubbers may be used, such as core-shell rubbers in Kaneka's ACE MX product range, Liquid rubbers having reactive groups may also be used. Thermoplastic toughening additives include polyarylethersulfones (PESs), polysulfones (PSFs), polyvinylformals (PVFs), polymethylmethacrylates (PMMAs), polyimides (PIs), polyetherimides (PEIs) and polyethylene oxides (PEOs). It will be appreciated that, where such additives are present, they are typically added to the pre-preg via their incorporation in the curable resin. The total amount of said additives in the curable resin is such that said additives constitute typically no more than about 20 wt %, more typically no more than about 10 wt %, by total weight of the pre-preg.

The curable resin preferably does not contain a cure inhibitor. Preferably the curable resin does not contain a cure inhibitor which is or comprises boric acid, a Lewis acid derivative of boron such as an alkyl borate or an alkyl borane or trimethoxyboroxine, a mineral acid having a nucleophilicity value "n" of greater than zero and less than 2.5 (for example perchloric acid or tetrafluoroboric acid, fluoroarsenic acid, fluoroantimonic acid, fluorophosphoric acid, chloroboric acid, chloroarsenic acid, chloroantimonic acid chlorophosphoric acid, chloric acid, bromic acid, iodic acid and any combination thereof), or an organic acid having a pKa value of from 1 to 3 (such as salicylic acid, oxalic acid and maleic acid and mixtures thereof), or a mixture of two or more thereof. The term "boric acid" as used herein refers to boric acid or derivatives thereof, including metaboric acid and boric anhydride, combinations of a Lewis acid with boron salts such as: alkyl borate, or trimethoxyboroxine. The term "a mineral acid having a nucleophilicity value "n" of greater than zero and less than 2.5" an acid having a weak nucleophilic anion wherein the nucleophilicity value "n" is defined by the method described by C. G. Swain and C. B. Scott in J. Am, Chem. Society, Vol. 75, p 141 (1953). It will be appreciated that such cure inhibitors are preferably not added to or present in the curable resins and resin formulations of the present invention described herein, nor present in the laminar pre-pregs of the present invention, nor used in the process of the present invention described herein.

The curable resin exhibits a cure conversion (measured as described herein) of at least 95%, preferably at least 98%, when cured at a cure temperature in the range of from about 100° C. to about 160° C., preferably from about 100° C. to about 150° C., preferably from about 120° C. to about 150° C., wherein the cure cycle has a duration of no more than 10 minutes, preferably no more than 8 minutes, preferably no more than 5 minutes. Preferably, the cure conversion is at least 95%, preferably at least 98% when cured at a temperature in the range of from 120° C. to 150° C. for a period of no more than 10 minutes, preferably for a period of no more than 5 minutes.

The curable resin preferably exhibits a viscosity at 21° C. of less than 1,000,000 Pa·s, preferably no more than 500,000 Pa·s, preferably no more than 300,000 Pa·s, preferably no more than 100,000 Pa·s, preferably from about 10,000 Pa·s to about 100,000 Pa·s.

The curable resin preferably exhibits an uncured glass transition temperature (Tg) of less than 8° C., preferably no more than 6° C., preferably no more than 3° C., and preferably at least about −6° C.

The pre-preg preferably comprises from about 20 to about 70%, preferably no more than about 60%, preferably at least about 35%, preferably at least about 50%, preferably in the range of from about 35 to about 70%, preferably from about 50% to about 60%, reinforcing fibres, wherein the percentages refer to the volume fraction of the fibre (Vf) by total volume of the pre-preg. The laminar pre-preg preferably comprises from about 30 to about 80%, preferably at least about 40%, preferably no more than about 65%, preferably no more than about 50%, preferably in the range from about 30 to about 65%, preferably from about 40% to about 50%, of curable resin, wherein the percentages refer to volume fraction of the resin, by total volume of the laminar pre-preg. The more and most preferred resin fractions are particularly advantageous for achieving the desired permeability characteristics described herein.

Where the reinforcing fibres are selected from carbon fibre, which is preferred, the pre-preg preferably comprises from about 40 to about 80 wt %, preferably no more than 75 wt %, preferably no more than about 70 wt %, preferably from about 45 to about 70 wt %, preferably from about 55% to about 70 wt %, preferably from about 58 to about 68 wt % and preferably from about 58 to about 64 wt % reinforcing fibres, by total weight of the pre-preg. The laminar pre-preg preferably comprises from about 20 to about 60 wt %, preferably at least about 25, preferably at least about 30 wt %, preferably from about 30 to about 55 wt %, preferably from about 30% to about 45 wt %, and more preferably from about 32 to about 42 wt %, more preferably from about 36 to about 42 wt % of curable resin by total weight of the laminar pre-preg.

The more and most preferred resin fractions are particularly advantageous for achieving the desired permeability characteristics described herein.

In the present disclosure, the proportions of the various components are such that the amount of reinforcing fibres plus the amount of curable resin equals 100%. It will be appreciated that reference to the "curable resin" in this context includes the curable resin components themselves, the curative(s) and the optional additives described hereinabove.

Preferably, the laminar prepreg exhibits an areal weight of from about 300 to about 1500 g/m², preferably from about 300 to about 1400 g/m², preferably from about 400 to about 1100 g/m² preferably from about 600 to about 1100 g/m², and these areal weights are particularly appropriate for pre-pregs in which the reinforcing fibres are selected from carbon fibre. It will be understood that the areal weight of the laminar prepreg includes the weight of the reinforcing fibres and the curable resin (i.e. including the curative(s) and any optional additives contained therein).

Preferably, the thickness of the laminar prepreg is no more than about 1500 μm, preferably no more than about 1000 μm, preferably no more than about 500 μm, preferably at least about 250 μm, preferably at least about 400 μm, preferably from about 400 μm to about 500 μm.

The laminar prepreg is manufactured by any suitable technique known in the art, such that the curable resin is contacted with the fibrous reinforcing agent in one or more of the forms noted above under conditions of temperature and pressure sufficient to cause the curable resin to flow and infuse or impregnate the fibres. The term "impregnate" refers to the introduction of a curable resin composition to reinforcement fibres so as to introduce the curable resin between the interstices of the fibres and/or fully or partially encapsulate the fibres. Thus, the pre-preg is prepared by the general method of:

a. providing a dry fibre preform comprised of one or more layers of reinforcing fibres;
   b. impregnating said dry fibre preform with the curable resin, wherein said curable resin is liquid.

In general terms, the dry fibre preform is impregnated with the curable resin by heating the curable resin to its molten state and disposing said molten curable resin on and into said dry fibre preform. Typical impregnating methods include:

(1) Continuously moving the reinforcing fibres through a bath of solvated resin composition to fully or substantially fully wet out the fibres; followed by the application of heat to evaporate the solvent; or
   (2) Pressing top and/or bottom resin films against a web of reinforcing fibres under elevated temperature.

A description of the hot-melt pre-preg manufacturing process is given in WO-2014/096435-A, the disclosure of which process is incorporated herein by reference.

Preferably, the laminar pre-preg is prepared by the hot-melt casting technique, particularly wherein low permeability is desired.

The resulting laminar pre-preg is typically a pliable sheet of material. The pre-preg is typically tacky, but may also exhibit low or no tack.

To form a moulded article, a plurality of pre-pregs is laid up into or onto a mould (often referred to as moulding tool) in a stacking arrangement to form a "pre-preg lay-up". The pre-preg plies within the lay-up may be positioned in a selected orientation with respect to one another. For example, pre-preg lay-ups may comprise pre-preg plies having uni-directional fibre arrangements, with the fibres oriented at a selected angle θ, e.g. 0°, 45°, or 90°, with respect to the largest dimension (typically defined as the length) of the lay-up. Once in place, the pre-pregs in the lay-up are cured as described hereinbelow.

The layup process is optionally an automated process. The automated handling of fibre-reinforced composite materials (commonly referred to in the art as pre-pregs, or resin-impregnated reinforcement fibre fabrics or mats) is well established. Disclosures which teach such methods and devices include US-2005/0042323-A and U.S. Pat. No. 7,341,086. A particularly preferred automated process is a robotic pick-and-place process. Such processes may require the use of protective interleaves, such as polymer sheets or paper, to enable the material to be easily unrolled, cut and handled, and such techniques are appropriate where the pre-preg exhibits a tacky surface. Alternatively, the applicant's co-pending GB1509294.3 and GB1509292.7 applications, the disclosure of which is incorporated herein by reference, provide automated processes which avoid the use of protective interleaves, and such processes can advantageously be used in the present invention where the pre-preg exhibits low tack or no tack. Other automated processes which avoid the use of protective interleaves are those which decrease the temperature of the working environment, thereby increasing the viscosity and reducing the tack of the fibre-reinforced composite material, although such methods are not preferred as they can be disadvantageous because they render the pre-preg brittle and inflexible, making them difficult to handle.

According to a third aspect of the invention, there is provided a process for the production of a moulded article from a plurality of pre-pregs comprising the steps of:
   (a) providing a mould;
   (b) disposing a laminar pre-preg into or onto said mould;
   (c) repeating step (b) at least once to dispose one or more further pre-pregs into or onto said mould; and
   (d) curing the plurality of pre-pregs, preferably by thermally curing;
wherein said laminar pre-preg is a fibre-reinforced curable composite material as defined herein.

Preferably, the process of the present invention is a press-moulding process.

The laminar pre-preg is preferably provided in the form of a wound roll of the pre-preg material (typically wound around a core of cardboard or other suitable material). The process typically therefore comprises the step of unwinding the pre-preg material onto a flat and level base, suitably securing the pre-preg material in position by a suitable securing means as is conventional in the art. One or more pre-determined shapes are then cut from the web of pre-preg material, optionally using a mechanised and automated cutting means as is known and conventional in the art. One suitable cutting means is a high-frequency rotationally operating oscillating saw blade. During the cutting step, the web of pre-preg may be supported and retained in place by a suitable retaining member. The pre-determined cut shape remains in the plane of the web of the remaining pre-preg material.

The pre-preg (or the pre-determined cut pre-preg shape) is then conveyed into or onto the mould. Optionally, the cut pre-preg shape may be conveyed to a stacking position where the cut pre-preg shapes are stacked or wherein the cut pre-preg shapes are deposited in or on a release film or lay-up mould or mould loading device, and then conveyed into or onto said mould.

After the desired or pre-determined number of pre-pregs has been laid in or on the mould, the plurality of pre-pregs are cured, preferably thermally cured. Preferably, curing is effected while the plurality of pre-pregs is compressed by a mould tool.

Curing is preferably effected while the pre-pregs are located in or on the mould, and preferably while the pre-pregs are compressed in a mould cavity, preferably a heated mould-cavity, preferably an isothermally heated mould cavity. Thus, curing is preferably effected in a press-moulding process where the temperature of the moulding surfaces of the mould or mould tool is fixed at a pre-determined temperature (isothermal tooling) to cure the pre-pregs. Thus, in the press-moulding process, after the desired or pre-determined number of pre-pregs has been laid in or on the mould, the pre-pregs are typically compressed by a mould press, so that the plurality of pre-pregs is in contact with the desired and appropriate moulding surface(s) of the mould, for instance in a mould cavity. The pre-pregs are heated rapidly, and as quickly as the mould tool allows.

In the present invention, thermal curing is conducted at a cure temperature (Tc) of at least 100° C., preferably at least 120° C., preferably no more than 160° C., preferably no more than 150° C., preferably in the range of from about 100° C. to about 160° C., preferably from about 100° C. to about 150° C., and preferably in the range of from about 120° C. to about 150° C. Preferably, thermal curing is conducted at a cure temperature (Tc) which is no more than 20° C. greater than (and preferably no more than 10° C. greater than), and is preferably no more than, and is preferably less than, the Tg of the curable resin when cured. Thus, preferably Tc≤Tg+20° C., more preferably Tc≤Tg+10° C., more preferably Tc≤Tg, and more preferably Tc<Tg. Preferably, thermal curing is conducted using a cure cycle having a duration of no more than 10 minutes, preferably no more than 8 minutes, preferably no more than 5 minutes. The cure cycle duration as defined herein is the period for which the plurality of pre-pregs is subjected to the pre-determined cure temperature. The cure cycle duration does not include the ramp phase or the cool-down phase. As noted hereinabove, the present invention is primarily directed to press-moulding processes where the mould tool is at a fixed temperature (isothermal tooling), and heats the pre-pregs as rapidly as possible.

In an alternative embodiment, thermal curing may be conducted in an oven or autoclave, and may be conducted under vacuum (for instance in a vacuum bag as known in the art), suitably conducted at elevated pressure, for instance at a pressure of from about 2 to about 10 bar. In this embodiment, the cure temperatures and cure cycle durations described hereinabove are also applicable, but typically the heating and cooling rates are controlled. Typically, the heating rate during the ramp phase is from about 1 to about 5° C./min, more typically from about 1 to about 3° C./min. Typically, the cooling rate in the cool-down phase is from about 1 to about 5° C./min, more typically from about 1 to about 3° C./min to 60° C.

The process further comprises the step of removing the moulded cured pre-preg(s) from the mould to provide the moulded article.

As noted above, the process of the third aspect of the invention may optionally be an automated process.

The glass transition temperature (Tg) of the curable resin when cured is in the range of from about 130° C. to about 165° C., preferably from about 130 to about 160° C. These upper limits of Tg are advantageous so that exothermic heat release is not too high, and also for reasons of economy and efficiency. It will be appreciated that these Tg values refer to the cured resin when in a state of cure defined by a cure conversion of at least 95%, preferably at least 85%.

Preferably, thermal curing is conducted at a cure temperature (Tc) which is no more than 20° C. greater than (and preferably no more than 10° C. greater than), and is preferably no more than, and is preferably less than, the Tg of the curable resin when cured. Thus, preferably Tc≤Tg+20° C., more preferably Tc≤Tg+10° C., more preferably Tc≤Tg, and more preferably Tc<Tg.

In the present invention, the fast-curing curable resins and resin formulations preferably have cure temperatures that are no more than 20° C. greater than, preferably no more than 10° C. greater than, preferably no more than, and preferably less than, the Tg of the curable resin when cured, i.e. the resins are preferably curable to a cure conversion of at least 95% (preferably at least 98%) at the afore-mentioned cure temperatures (100-160° C., preferably 100-150° C. preferably 120-150° C.) wherein said cure temperature is no more than 20° C. greater than, preferably no more than 10° C. greater than, preferably no more than, and preferably less than, the Tg of the cured resin. In many conventional prior art resin systems where relatively high mould temperatures are used to obtain rapid cure times, the cure temperature is significantly higher (for instance at least 20° C. or at least 10° C. more) than the Tg of the cured resin, and while the resin component is fully cured, it is too soft to be removed from the mould (for instance without posing a high risk of distortion), and it is necessary to cool the mould to below the Tg of the cured resin before removing the cured component from the mould. Such a cooling step is an additional, undesirable step which increases the time required to produce a component, lowers the number of components that can be produced by a mould during a work cycle, and undesirably increases costs. The afore-mentioned fast-curing curable resins and resin formulations of the present invention are particularly advantageous because they allow the moulding process to dispense with the step of cooling the mould before removing the cured component therefrom. Indeed, in the process of the present invention, it is preferred that the process does not comprise the step of cooling the mould prior to removing the moulded cured pre-preg(s) therefrom.

The moulded articles prepared by the process described herein are particularly suitable as components for transport applications, and particularly the automotive industry. The automotive components prepared by the present invention are particularly suitable as mid- or high-volume automotive parts (for instance, structural parts such as body or chassis components, e.g. spare wheel well or boot lid etc.), in which cost and speed of production are paramount. The present invention provides a process which provides advantages of efficiency and economy. The lay-up time according to the present invention is significantly reduced, allowing a reduction in the unit cost per component and/or allowing the high volume of component production desired in the automotive industry. The term "automotive industry" herein is a particular reference to road transport vehicles, including cars, buses, trucks and motorcycles and the like.

Various embodiments of the invention are described herein. It will be recognised that features specified in each embodiment may be combined with other specified features to provide further embodiments.

MEASUREMENT METHODS

Figure 1:
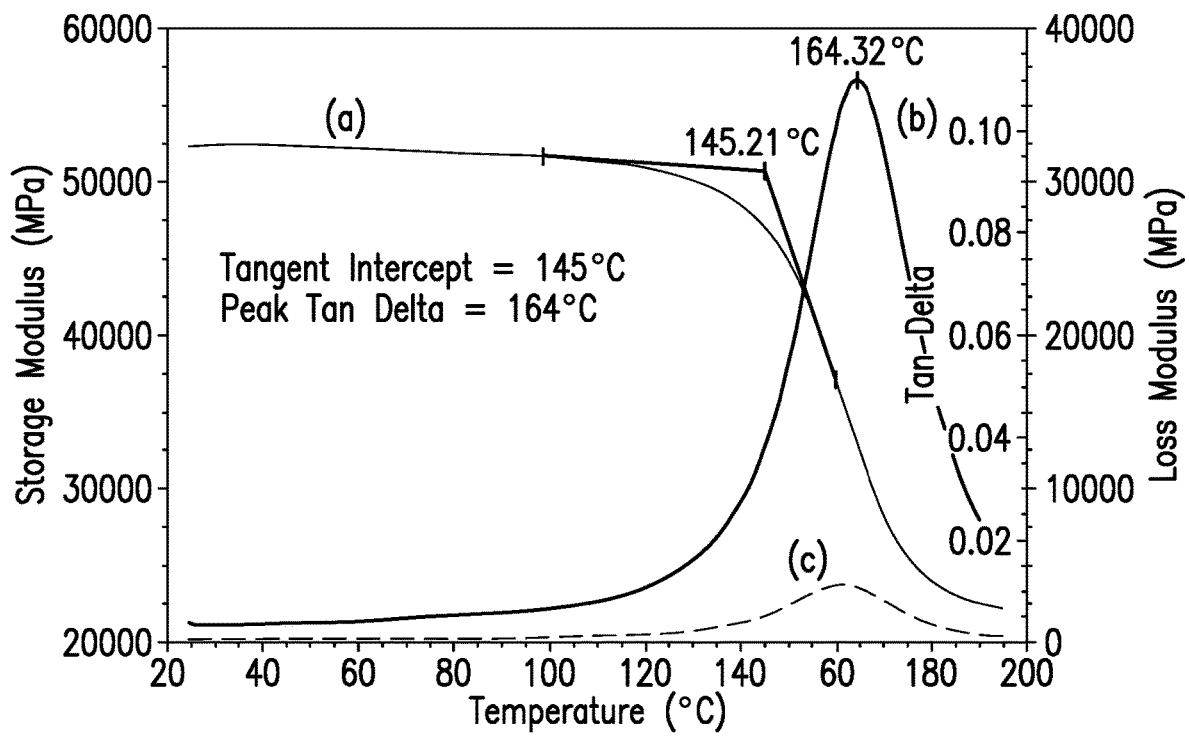
FIG. 1 shows the plot obtained for an embodiment (Example 2) in the Dynamic Mechanical Analysis test method disclosed hereinbelow for measurement of Tg; the storage modulus is shown as plot (a); the tan delta is shown as plot (b) and the loss modulus is shown as plot (c).

The pre-pregs described herein were characterised as follows.

Viscosity The viscosity of the resins was measured, at 21° C. unless otherwise stated, by following ASTM D4440-15: using a 25 mm diameter parallel plate, with a strain of 1%, a frequency of 1 Hz and a gap of 500 μm.

Glass Transition Temperature

The glass transition temperature, $T_g$, of the cured resins was measured by Dynamic Mechanical Analysis (DMA) using a dynamic mechanical analyser (TA Instruments Q800) under flexural oscillation mode according to ASTM 7028-07, with a heating rate of 5° C./min and without purge gas. The thermocouple in the TA Instruments Q800 equipment remained in its fixed position. The dimensions of the sample were 58±5×10±1×1.75±0.75 mm (Length×Wdth×Thickness). The Tg reported herein is the intercept of the two tangent lines (i.e. the Lines "A" and "B" referred to in ASTM 7028-07) from the plot of storage modulus on a linear scale vs. temperature.

The uncured glass transition temperature, $T_g$, of the resins was measured by differential scanning calorimetry (DSC) at a heating rate of 10° C. per minute, according to ISO 11357-2:2013, on a Metler Toledo DSC 822e instrument.

Cure Conversion

Differential Scanning calorimetry (DSC) was utilized to determine the cure conversion under a given set of cure conditions, substantially in accordance with ISO-11357-5: 2013. The residual enthalpy (remaining heat of reaction) detected during the DSC measurement is correlated to the total enthalpy (heat evolved) of the curing reaction. DSC measurements are performed by heating a sample from 30° C. to a temperature that is sufficient to capture the entire curing reaction (225° C. is sufficient for the resins of interest described herein) at a heating rate of 10° C./min. The sample size is about 5-10 mg. The cure conversion (%) is calculated as:

$$\text{cure conversion (\%)} = \frac{(\Delta Hi - \Delta He)}{\Delta Hi} \times 100$$

wherein:

ΔHi is the enthalpy generated by the uncured test sample during heating from 30° C. to 225° C.; and ΔHe is the enthalpy generated by a cured sample during the heating scan of heated from 30° C. to 225° C.

The invention is further illustrated with reference to the following non-limiting examples.

Epoxy Equivalent Weight (EEW)

Epoxy equivalent weight is assessed according to ISO3001:1999.

EXAMPLES

Pre-pregs were prepared using the components presented in Table 1 below.

TABLE 1

Materials

| Material Trade Name | Chemical Description | Supplier |
|---|---|---|
| Araldite ® EPN1138 | Epoxy phenol novolak resin | Huntsman |
| Araldite ® LY1556 | Diglycidyl ether of bisphenol A (liquid) | Huntsman |
| Araldite ® GT7071 | Diglycidyl ether of bisphenol A (solid) | Huntsman |
| Araldite ® ECN1273 | Epoxy cresol novolak resin | Huntsman |
| Araldite ® MY9512 | Tetra-functional epoxy based on methylene dianiline | Huntsman |
| Dyhard ® DF50EP | 50% Dicyandiamide dispersed in a 50% Bisphenol-A epoxy resin | Alzchem |
| Dyhard ® UR505 | Substituted urea catalyst | Alzchem |
| Imicure ® EMI-24 Curing Agent 90% | 2-Ethyl-4-methylimidazole | Air Products |
| Curimid ® CN | 1-(Cyanoethyl)-2-ethyl-4-methylimidazole | PCI synthesis |
| WS17321A | Black Pigment dispersed in Diglycidyl ether of bisphenol A (liquid) | West & Senior |
| Succinic Acid | Butanedioic Acid | DSM |

Example 1

An epoxy resin formulation according to Table 2 below was prepared by blending the first three ingredients listed at 150° C. until all the Araldite® GT7071 had dissolved. At 50° C. the remaining two ingredients were added and mixed until uniform.

TABLE 2

Epoxy resin formulation of Example 1

| Ingredient | % |
|---|---|
| Araldite EPN1138 | 44.6 |
| Araldite LY1556 | 19.6 |
| Araldite GT7071 | 24.1 |
| Dyhard DF50EP | 9.0 |
| 1-(Cyanoethyl)-2-ethyl-4-methylimidazole | 2.7 |

The resin formulation of Table 2 exhibited an EEW (based only on the epoxy components) of 220 g/mol). The resin was analysed by DSC (differential scanning calorimetry), which demonstrated that the resin exhibits 95% cure conversion after 5 minutes at 150° C.; 97% cure conversion after 10 minutes at 150° C.; and 99% cure conversion after 5 minutes at 160° C.

Example 2

A prepreg was prepared from the epoxy resin formulation of Example 1 as follows. A carbon fibre fabric (2×2 twill weave; areal weight of 200 gsm) manufactured from a 3k fibre (HTA40-E13-3K available from Toho Tenax®) was impregnated with the epoxy resin formulation of Example 1 to obtain a prepreg with a resin content of 38%. The prepreg was used to make a 10-ply 0/90° laminate which was then subjected to a 3 minute cure at a curing temperature of 150° C. The curing was performed in a steel-matched die tool pre-heated to the curing temperature. The resulting laminate was tested by DMA following ASTM 7028-07, and found to exhibit a Tg of about 145° C. (see FIG. 1).

In FIG. 1, the storage modulus is shown as plot (a); the tan delta is shown as plot (b) and the loss modulus is shown as plot (c).

Example 3

Figure 2:
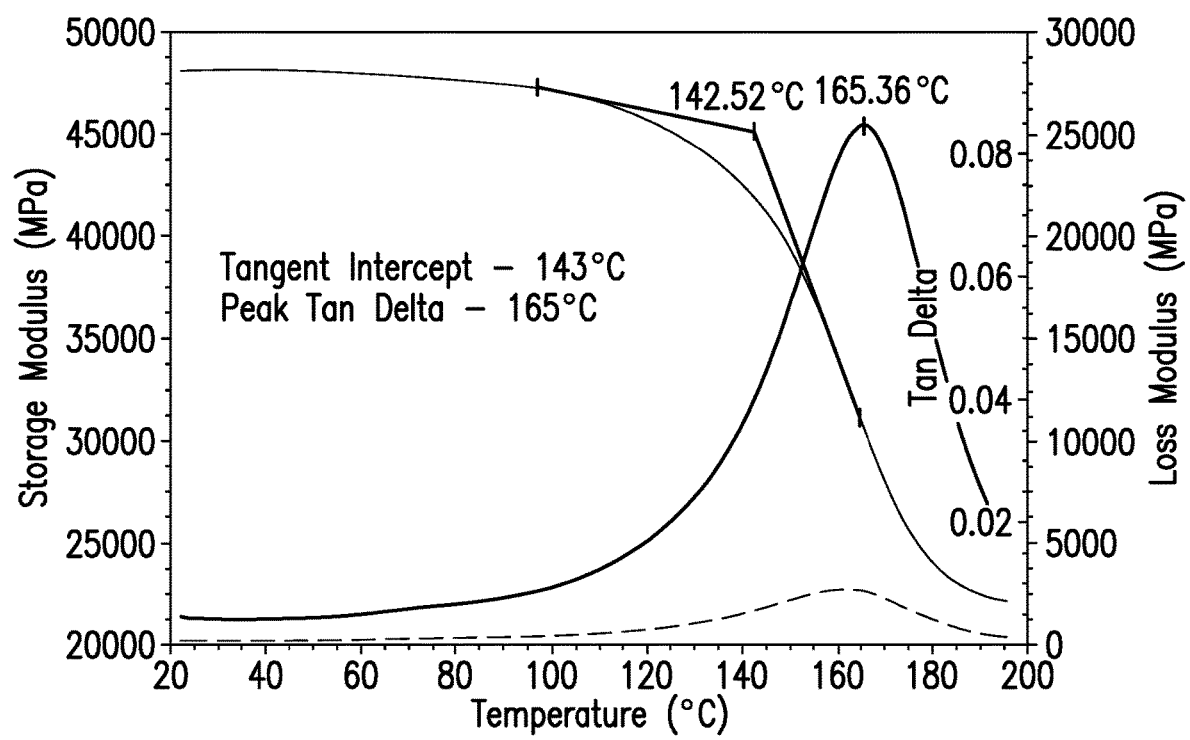
FIGS. 2-13 show corresponding plots for Examples 3, 4, 6, 7, 9, 10, 12, 13, 15, 16, 18, and 19, repsectively.

A prepreg was prepared from the epoxy resin formulation of Example 1. A carbon fibre fabric (2×2 twill weave; areal weight of 660 gsm) manufactured from a 12k fibre (T700SC-12k-60E available from Toray) was impregnated with the epoxy resin formulation of Example 1 to obtain a prepreg with a resin content of 38%. The prepreg was used to make a 3 ply 0°/90° laminate which was then subjected to a 3 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 143° C. (see FIG. 2).

Example 4

Figure 3:
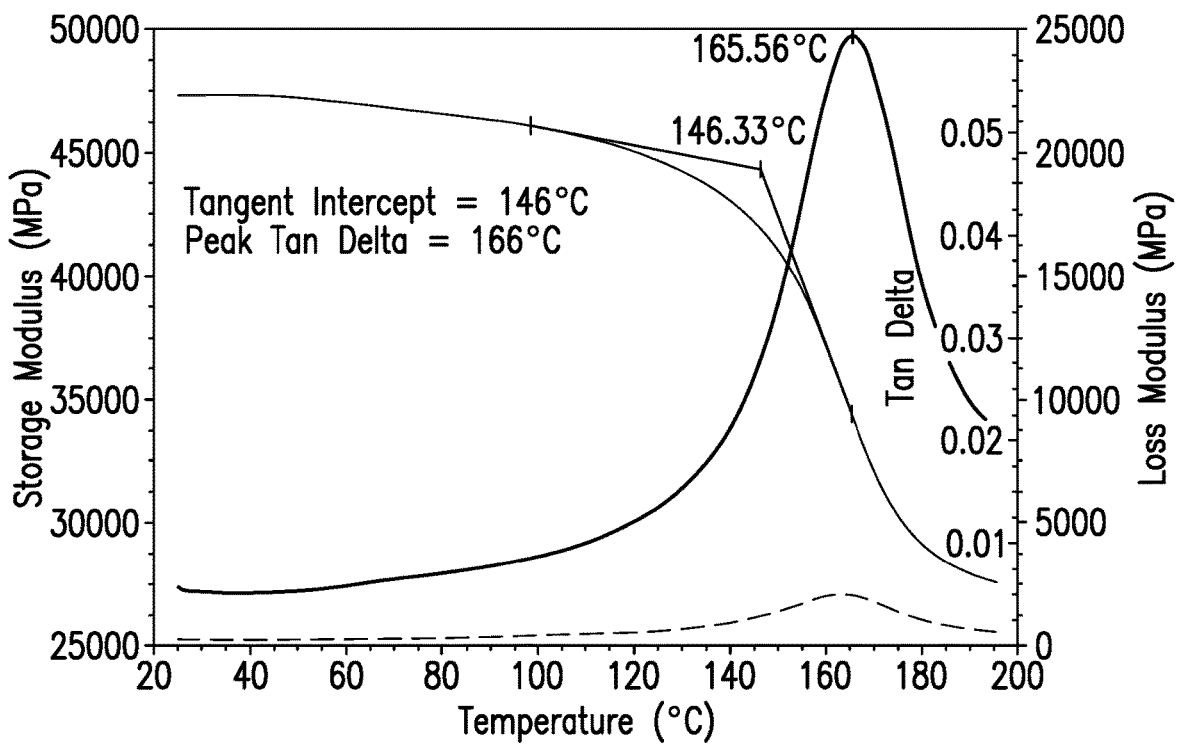

A prepreg was prepared from the epoxy resin formulation of Example 1. A carbon fibre fabric (+/−45° non-crimp fabric; areal weight of 600 gsm) manufactured from a 24k fibre (STS40-F13-24k available from Toho Tenax) was impregnated with the epoxy resin formulation of Example 1 to obtain a prepreg with a resin content of 38%. The prepreg was used to make a 4 ply laminate which was then subjected to a 3 minute cure at a curing temperature of 150° C. The curing was performed in a steel-matched die tool pre-heated to the curing temperature. The resulting laminate was cut into DMA specimens in such a way that the fibres were oriented at 0° and 90° to its length, which were then tested by DMA following ASTM 7028-07 in the same way as Example 2, and found to exhibit a Tg of about 146° C. (see FIG. 3).

Example 5

An epoxy resin formulation according to Table 3 below was prepared by blending the first three ingredients listed at 150° C. until all the Araldite® GT7071 had dissolved. At 50° C. the remaining ingredient was added and mixed until uniform.

TABLE 2

| Epoxy resin formulation | |
|---|---|
| Ingredient | % |
| Araldite EPN1138 | 48.1 |
| Araldite LY1556 | 22.1 |
| Araldite GT7071 | 26.0 |
| 1-(Cyanoethyl)-2-ethyl-4-methylimidazole | 3.8 |

The resin formulation of Table 3 exhibited an EEW (based only on the epoxy components) of 221 g/mol. The resin was analysed by DSC, which demonstrated that the resin exhibits 98% cure conversion after 5 minutes at 150° C.; 98% cure conversion after 10 minutes at 150° C.; and 99% cure conversion after 5 minutes at 160° C.

Example 6

Figure 4:
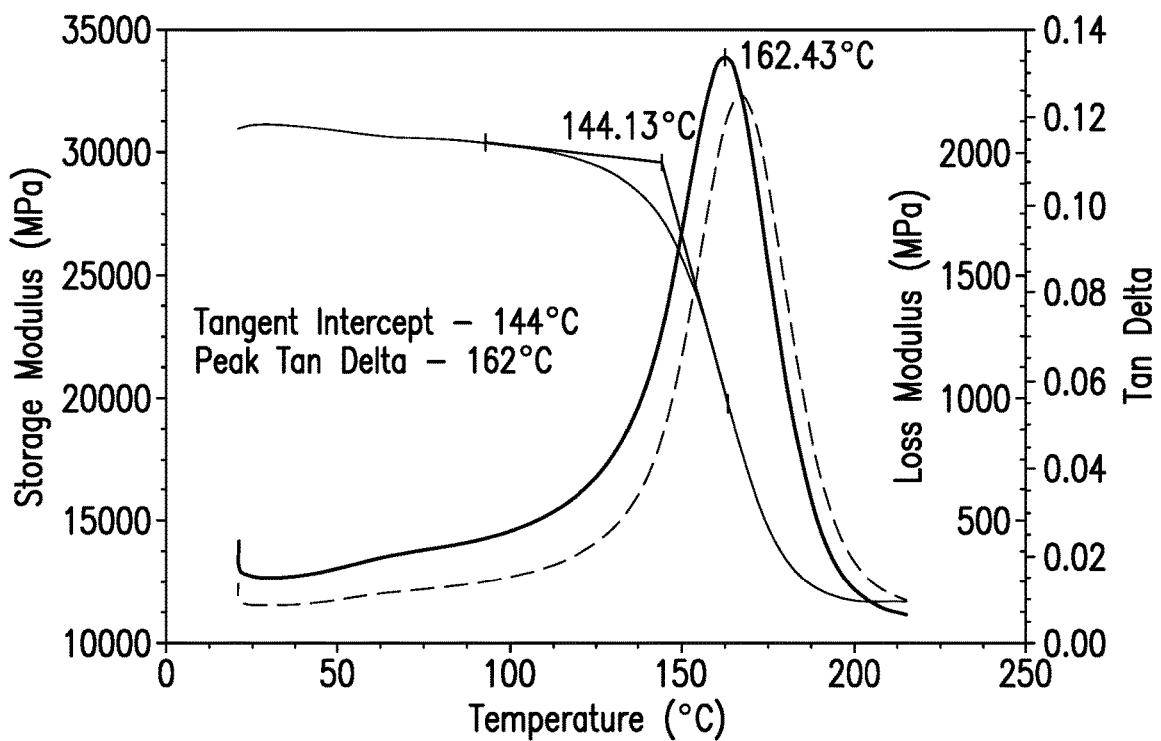

A prepreg was prepared from the epoxy resin formulation of Example 5 as follows. A carbon fibre fabric (2×2 twill weave; areal weight of 200 gsm) manufactured from a 3k fibre (HTA40-E13-3K available from Toho Tenax®) was impregnated with the epoxy resin formulation of Example 1 to obtain a prepreg with a resin content of 38%. The prepreg was used to make a 10-ply 0/90° laminate which was then subjected to a 5 minute cure at a curing temperature of 150° C. The curing was performed in a steel-matched die tool pre-heated to the curing temperature. The resulting laminate was tested by DMA following ASTM 7028-07, and found to exhibit a Tg of about 144° C. (see FIG. 4).

Example 7

Figure 5:
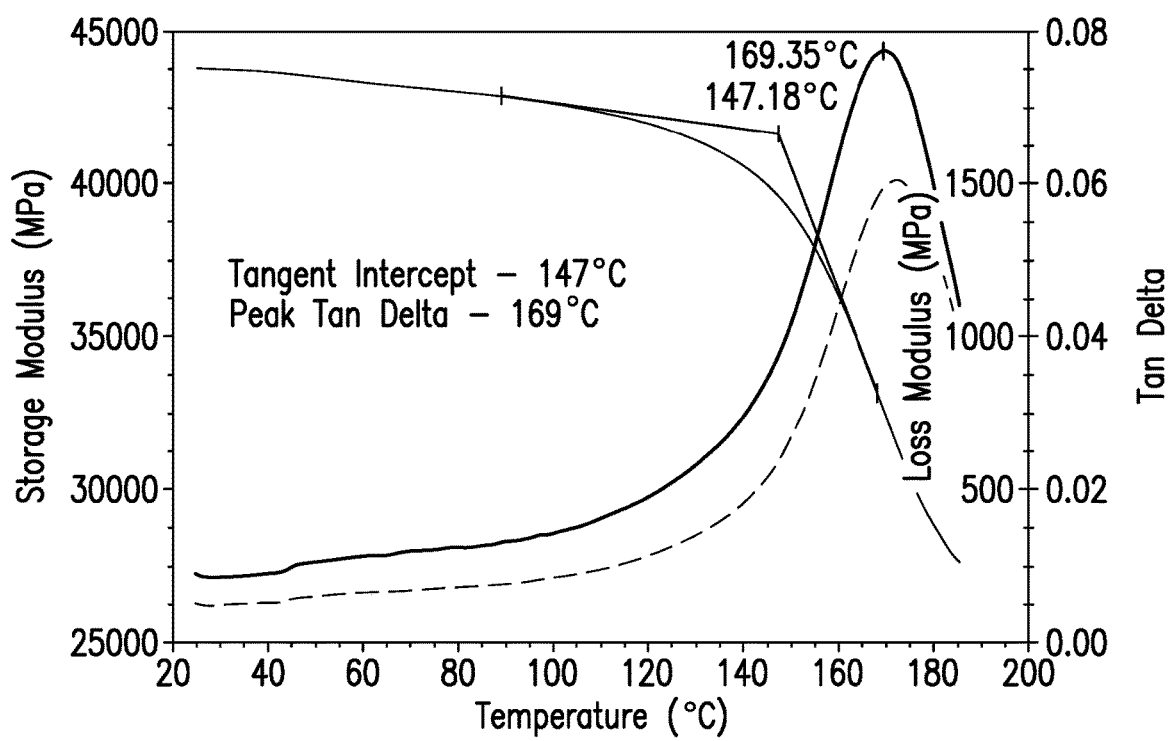

A prepreg was prepared from the epoxy resin formulation of Example 5. A carbon fibre fabric (2×2 twill weave; areal weight of 660 gsm) manufactured from a 12k fibre (T700SC-12k-60E available from Toray) was impregnated with the epoxy resin formulation of Example 1 to obtain a prepreg with a resin content of 38%. The prepreg was used to make a 3 ply 0°/90° laminate which was then subjected to a 5 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 147° C. (see FIG. 5).

Example 8

An epoxy resin formulation according to Table 4 below was prepared by blending the first three ingredients listed at 150° C. until all the Araldite® GT7071 had dissolved. Separately 1-(Cyanoethyl)-2-ethyl-4-methylimidazole and Succinic Acid were blended at 80° C. until all the Succinic Acid had dissolved.

At 50° C. the two preblends were mixed and the remaining two ingredients were added and mixed until uniform.

TABLE 4

| Epoxy resin formulation | |
|---|---|
| Ingredient | % |
| Araldite EPN1138 | 61.3 |
| Araldite LY1556 | 12.25 |
| Araldite GT7071 | 14 |
| Dyhard DF50EP | 8.75 |
| 1-(Cyanoethyl)-2-ethyl-4-methylimidazole | 2.65 |
| Succinic Acid | 0.95 |
| WS17321A | 0.1 |

The resin formulation of Table 4 exhibited an EEW (based only on the epoxy components) of 201 g/mol. The resin was analysed by DSC, which demonstrated that the resin exhibits 97% cure conversion after 5 minutes at 150° C.; and 99% cure conversion after 5 minutes at 160° C.

Example 9

Figure 6:
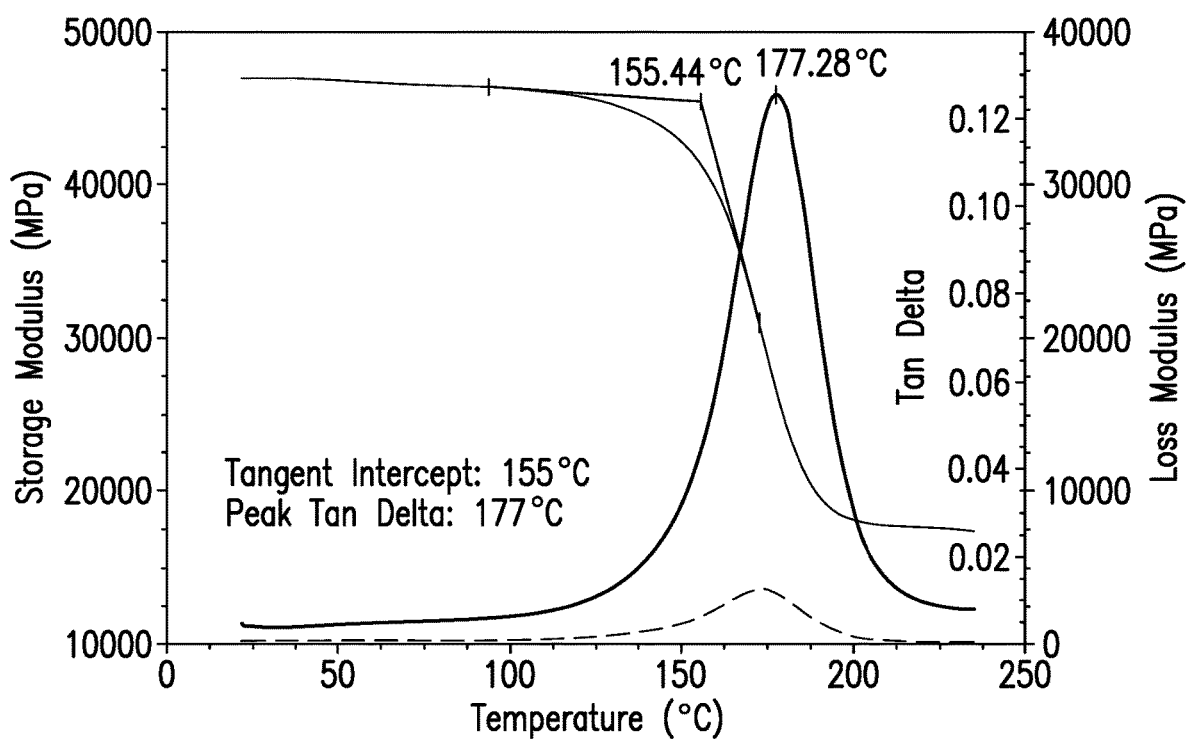

A prepreg was prepared from the epoxy resin formulation of Example 8 as per Example 6 but using Example 8 resin formulation. The prepreg was used to make a 10-ply 0/90° laminate which was then subjected to a 3 minute cure at a curing temperature of 150° C. The curing was performed in a steel-matched die tool pre-heated to the curing temperature. The resulting laminate was tested by DMA following ASTM 7028-07, and found to exhibit a Tg of about 155° C. (see FIG. 6).

Example 10

A prepreg was prepared from the epoxy resin formulation of Example 8 as per

Figure 7:
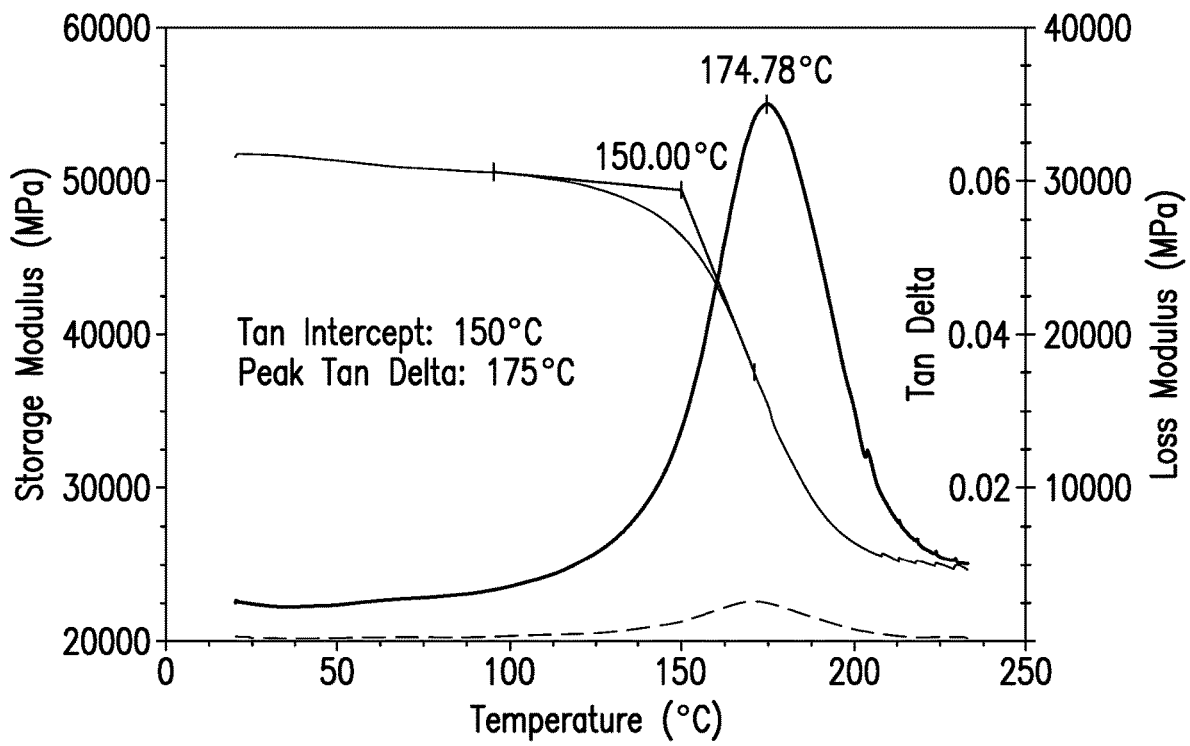

Example 7 but using Example 8 resin formulation. The prepreg was used to make a 3 ply 0°/90° laminate which was then subjected to a 3 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 150° C. (see FIG. 7).

Example 11

An epoxy resin formulation according to Table 5 below was prepared by blending the first three ingredients listed at 150° C. until all the Araldite® GT7071 had dissolved. At 50° C. the remaining ingredient was added and mixed until uniform.

TABLE 5

| Epoxy resin formulation | |
|---|---|
| Ingredient | % |
| Araldite EPN1138 | 48.5 |
| Araldite LY1556 | 24.3 |
| Araldite GT7071 | 24.3 |
| Imicure EMI-24 Curing Agent 90% | 2.9 |

The resin formulation of Table 5 exhibited an EEW (based only on the epoxy components) of 218 g/mol. The resin was analysed by DSC, which demonstrated that the resin exhibits 97% cure conversion after 5 minutes at 150° C.; 98% cure conversion after 10 minutes at 150° C.; and 99% cure conversion after 5 minutes at 160° C.

Example 12

Figure 8:
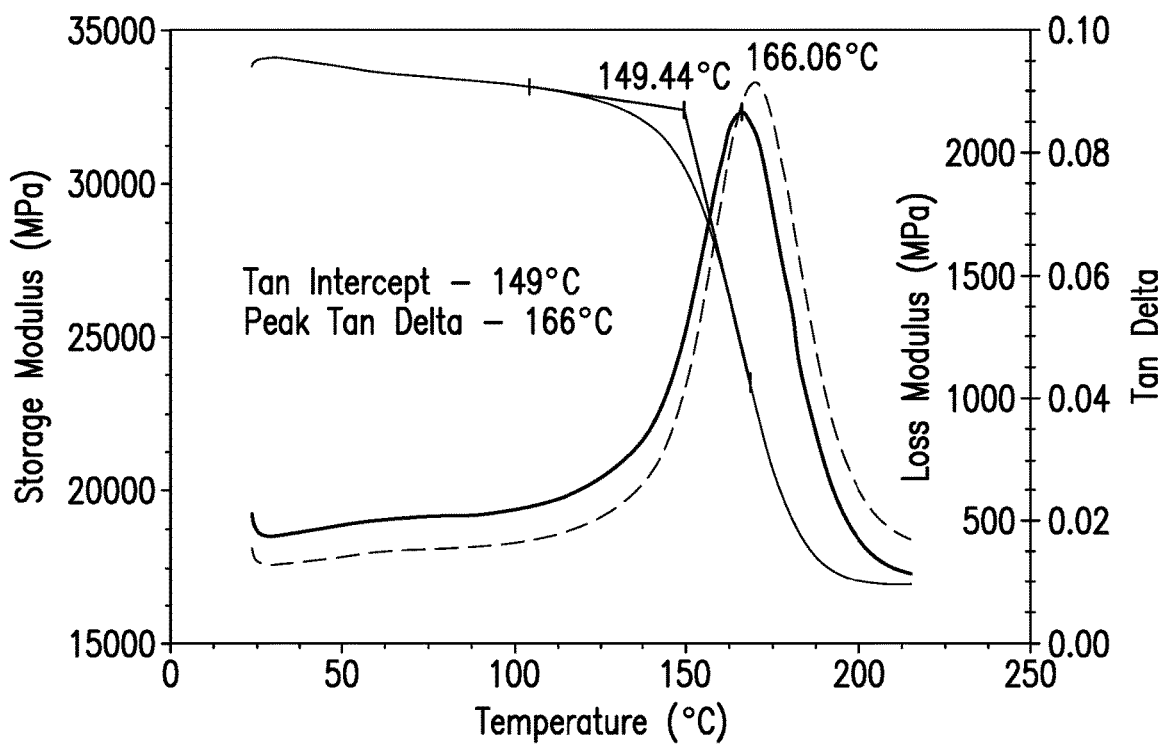

A prepreg was prepared from the epoxy resin formulation of Example 11 as per Example 6 but using Example 11 resin formulation. The prepreg was used to make a 10-ply 0/90° laminate which was then subjected to a 5 minute cure at a curing temperature of 150° C. The curing was performed in a steel-matched die tool pre-heated to the curing temperature. The resulting laminate was tested by DMA following ASTM 7028-07, and found to exhibit a Tg of about 149° C. (see FIG. 8).

Example 13

Figure 9:
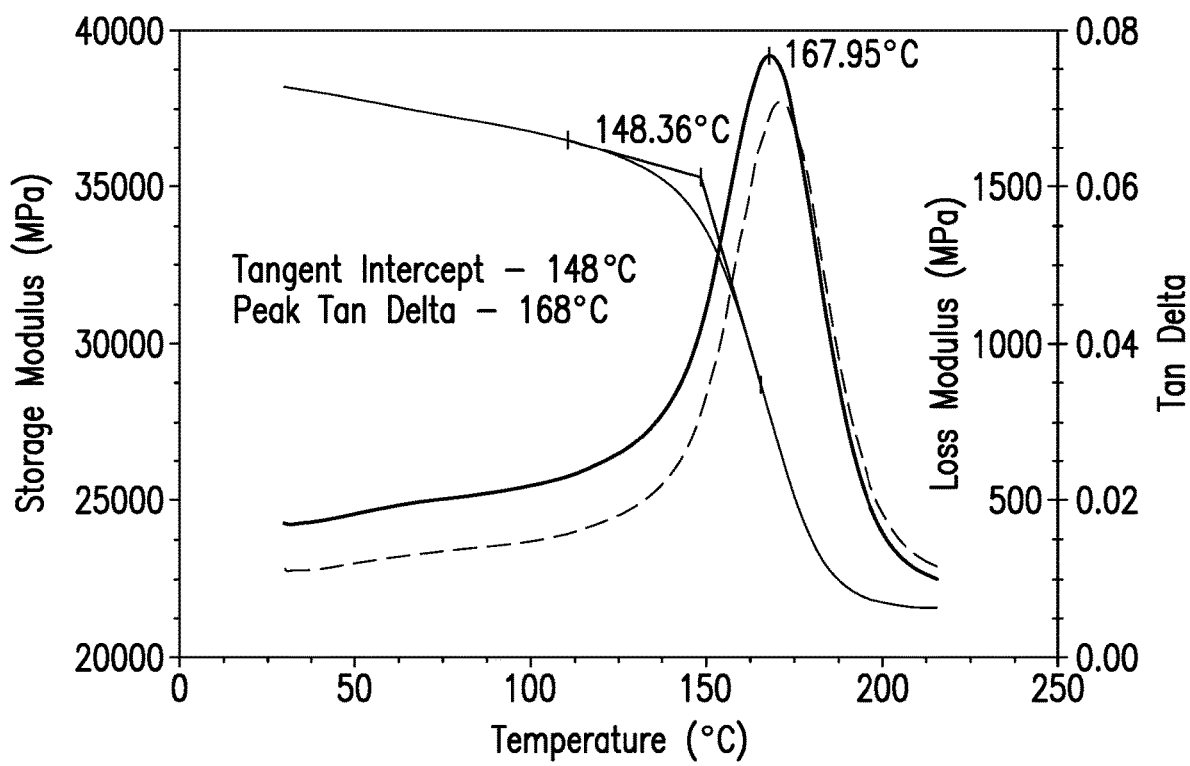

A prepreg was prepared from the epoxy resin formulation of Example 11 as per Example 7 but using Example 11 resin formulation. The prepreg was used to make a 3 ply 0°/90° laminate which was then subjected to a 5 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 148° C. (see FIG. 9).

Example 14

An epoxy resin formulation according to Table 6 below was prepared by blending the first two ingredients listed at 150° C. until all the Araldite® GT7071 had dissolved. At 50° C. the remaining ingredients were added and mixed until uniform.

TABLE 6

| Epoxy resin formulation | |
|---|---|
| Ingredient | % |
| Araldite LY1556 | 31.7 |
| Araldite GT7071 | 40.4 |
| Araldite MY9512 | 24.1 |
| 1-(Cyanoethyl)-2-ethyl-4-methylimidazole | 3.8 |

The resin formulation of Table 6 exhibited an EEW (based only on the epoxy components) of 221 g/mol. The resin was analysed by DSC, which demonstrated that the resin exhibits 99% cure conversion after 5 minutes at 150° C. and 99% cure conversion after 5 minutes at 160° C.

Example 15

Figure 10:
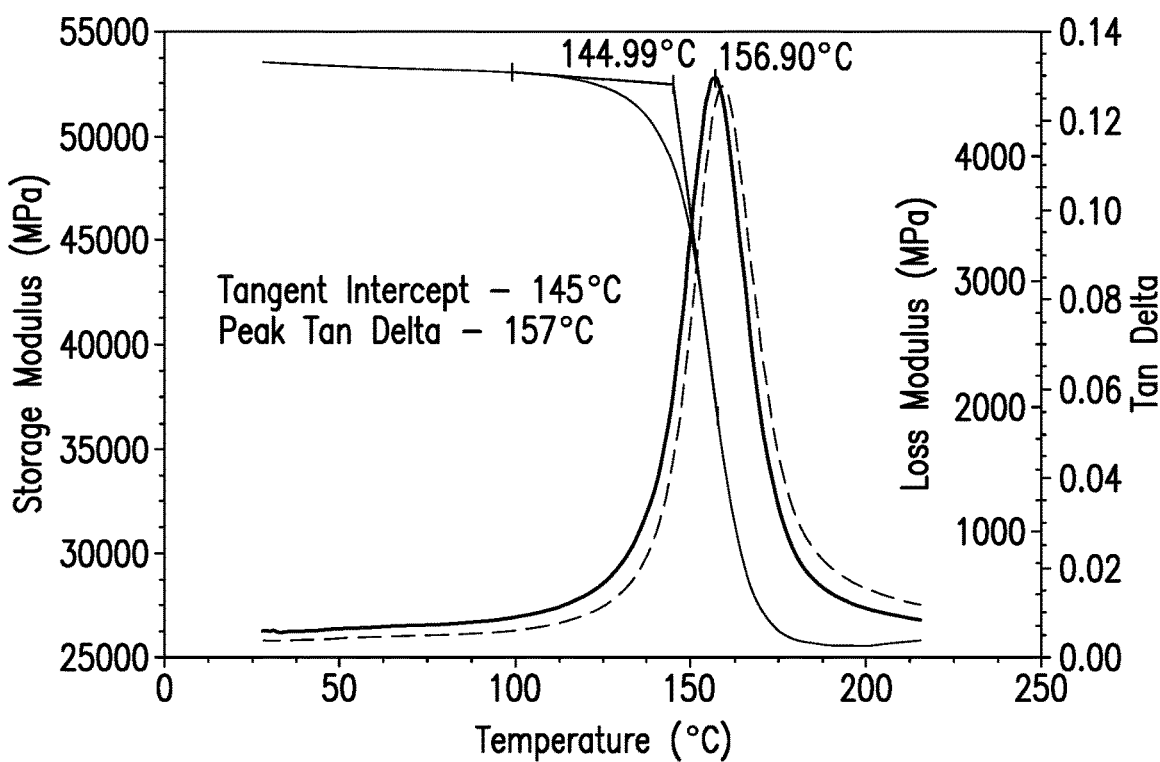

A prepreg was prepared from the epoxy resin formulation of Example 14 as per Example 6 but using Example 14 resin formulation. The prepreg was used to make a 10-ply 0/90° laminate which was then subjected to a 5 minute cure at a curing temperature of 150° C. The curing was performed in a steel-matched die tool pre-heated to the curing temperature. The resulting laminate was tested by DMA following ASTM 7028-07, and found to exhibit a Tg of about 145° C. (see FIG. 10).

Example 16

Figure 11:
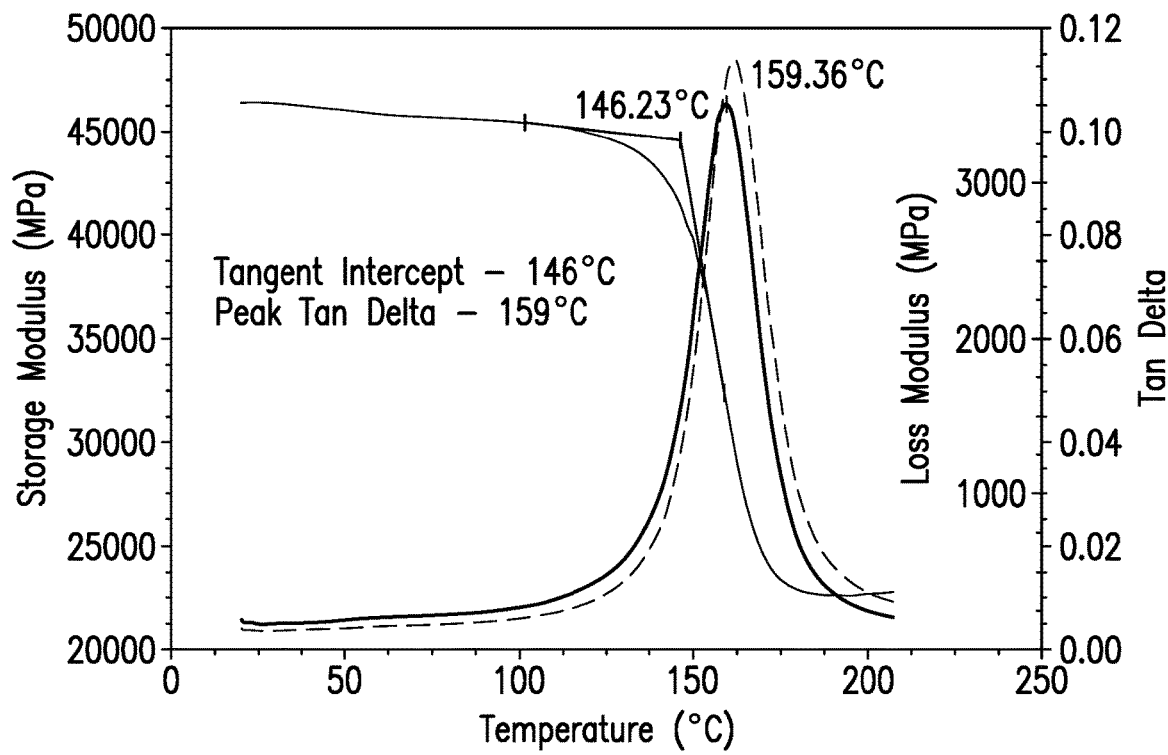

A prepreg was prepared from the epoxy resin formulation of Example 14 as per Example 7 but using Example 14 resin formulation. The prepreg was used to make a 3 ply 0°/90° laminate which was then subjected to a 5 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 146° C. (see FIG. 11).

Example 17

An epoxy resin formulation according to Table 6 below was prepared by blending the first two ingredients listed at 150° C. until all the Araldite® GT7071 had dissolved. At 50° C. the remaining ingredients were added and mixed until uniform.

TABLE 7

| Epoxy resin formulation | |
|---|---|
| Ingredient | % |
| Araldite LY1556 | 48 |
| Araldite ECN1273 | 40 |
| Dyhard DF50EP | 8.9 |
| 1-(Cyanoethyl)-2-ethyl-4-methylimidazole | 3.3 |

The resin formulation of Table 7 exhibited an EEW (based only on the epoxy components) of 234 g/mol. The resin was analysed by DSC, which demonstrated that the resin exhibits 94% cure conversion after 5 minutes at 150° C. and 97% cure conversion after 5 minutes at 160° C.

Example 18

Figure 12:
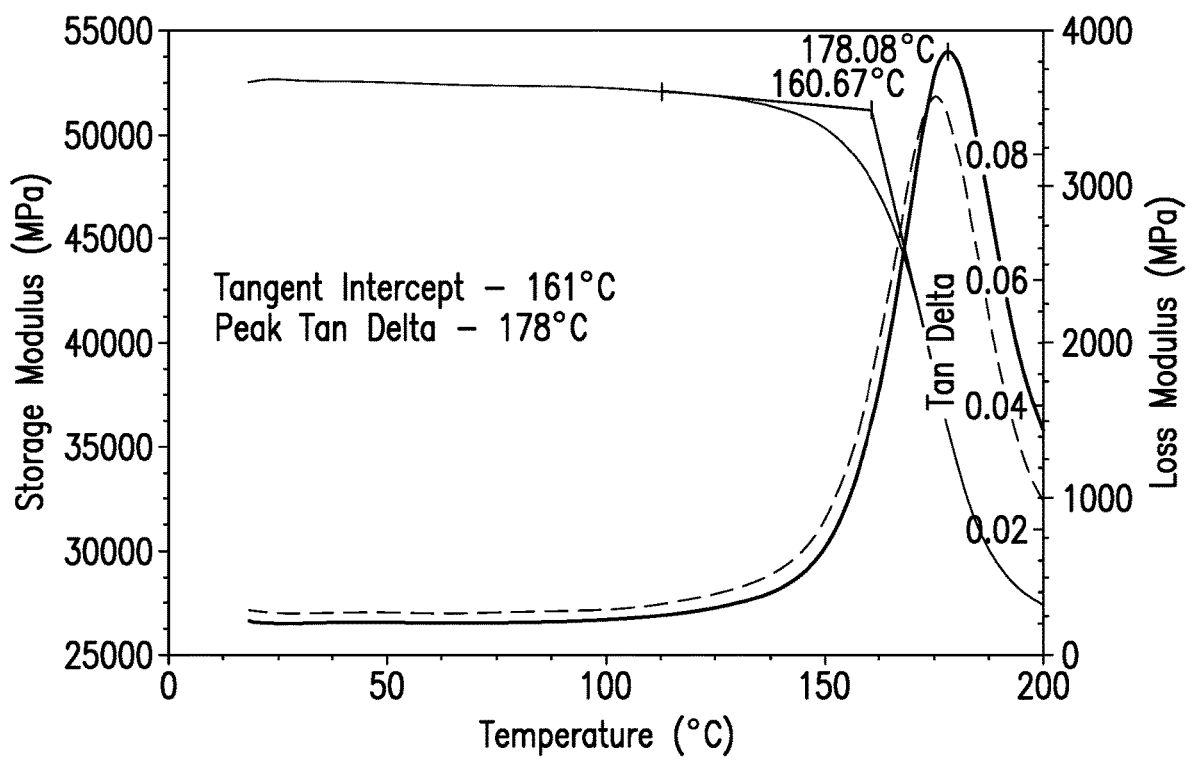

A prepreg was prepared from the epoxy resin formulation of Example 17 as per Example 6 but using Example 17 resin formulation. The prepreg was used to make a 10-ply 0/90° laminate which was then subjected to a 5 minute cure at a curing temperature of 150° C. The curing was performed in a steel-matched die tool pre-heated to the curing temperature. The resulting laminate was tested by DMA following ASTM 7028-07, and found to exhibit a Tg of about 161° C. (see FIG. 12).

Example 19

Figure 13:
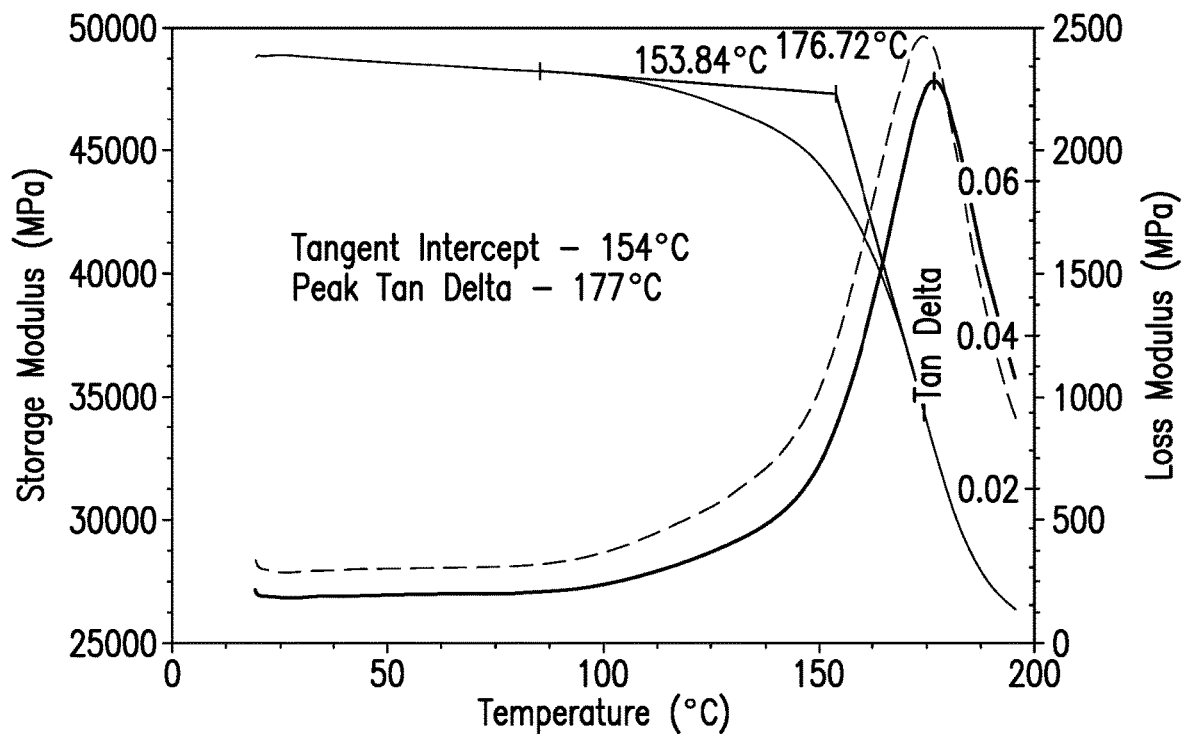

A prepreg was prepared from the epoxy resin formulation of Example 17 as per Example 7 but using Example 17 resin formulation The prepreg was used to make a 3 ply 0°/90° laminate which was then subjected to a 5 minute cure at a curing temperature of 150° C. The curing was performed in a steel-matched die tool pre-heated to the curing temperature. The resulting laminate was tested by DMA following ASTM 7028-07 in the same way as Example 2, and found to exhibit a Tg of about 154° C. (see FIG. 13).

Comparative Example 1

The resin formulation presented in Table 8 below was exemplified in WO-2014/096435-A.

TABLE 8

| Compound | wt % | Description |
|---|---|---|
| Epoxy resin formulation | 77.5 | See below |
| DICY | 18.0 | 50% Dicyandiamide in 50% Bisphenol-A epoxy resin |
| Dyhard UR505 | 4.5 | bis urea accelerator |
| Composition Epoxy resin formulation | | |
| Phenoxy resin | 3.9 | YP50 supplied by Kukdo |
| Bisphenol-A epoxy resin | 59.4 | EEW 320, 2-functional |
| Epoxy phenyl novolac, YD PN 638 | 35.6 | EEW 180, 3.6 functional |
| | 100.00 | |

The present inventors faithfully reworked the above resin formulation, using the following replacement commercially available components Araldite® EPN1138 for the Epoxy Phenyl novolac, with an EEW of 180 and a functionality of 3.6.

A blend of Araldite® LY1556 and Araldite® GT7071 for the Bisphenol-A epoxy resin, with an EEW of 320 and a functionality of 2.

Figure 14:
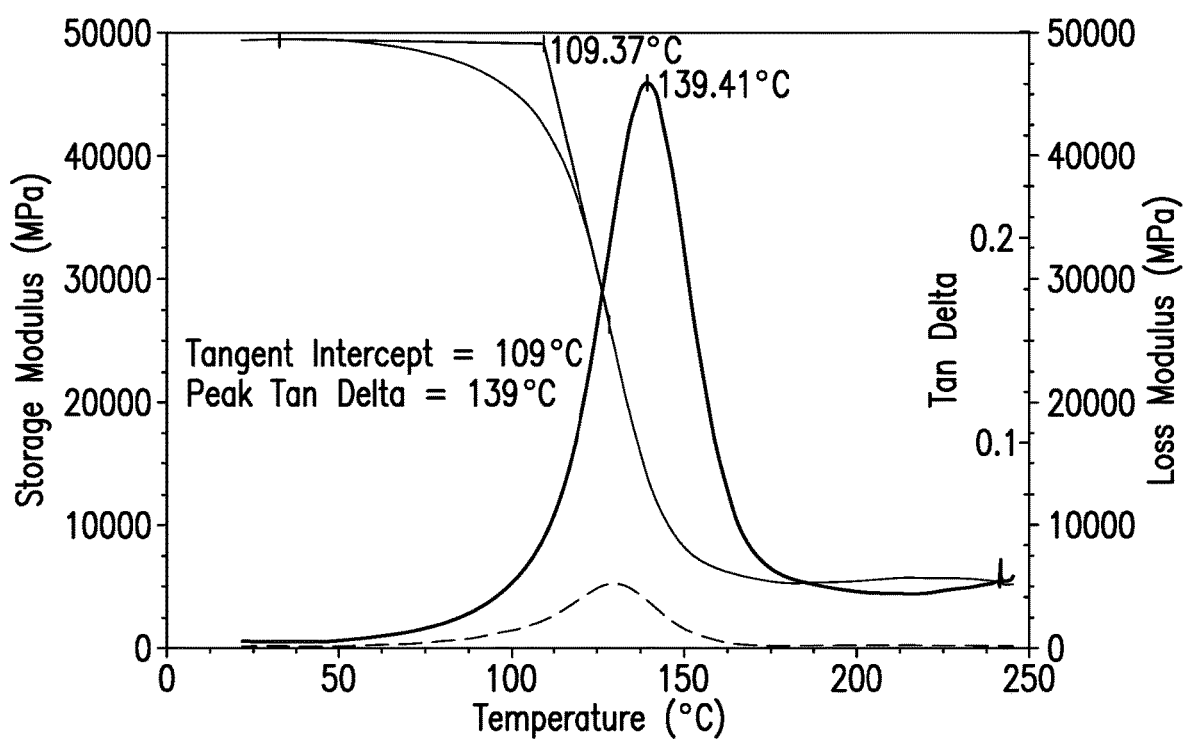
FIGS. 14-17 show corresponding plots for Comparative Examples 1-4, respectively.

Dyhard® DF50EP was used as the 50% dicyandiamide dispersed in a 50% Bisphenol-A epoxy resin Dyhard® UR505 as listed A prepreg was prepared from this epoxy resin formulation along using the same 200 gsm 3k carbon fibre fabric as that used in Example 2. The prepreg had a resin content of 38%. This prepreg was used to make a 10 ply laminate which was then subjected to a 5 minute cure at 150° C. The curing was performed in a steel-matched die tool that was pre-heated to the curing temperature. The resulting laminate was tested by DMA following ASTM 7028-07 in the same way as Example 2, and found to exhibit a Tg of about 109° C. (see FIG. 14).

Comparative Example 2

Figure 15:
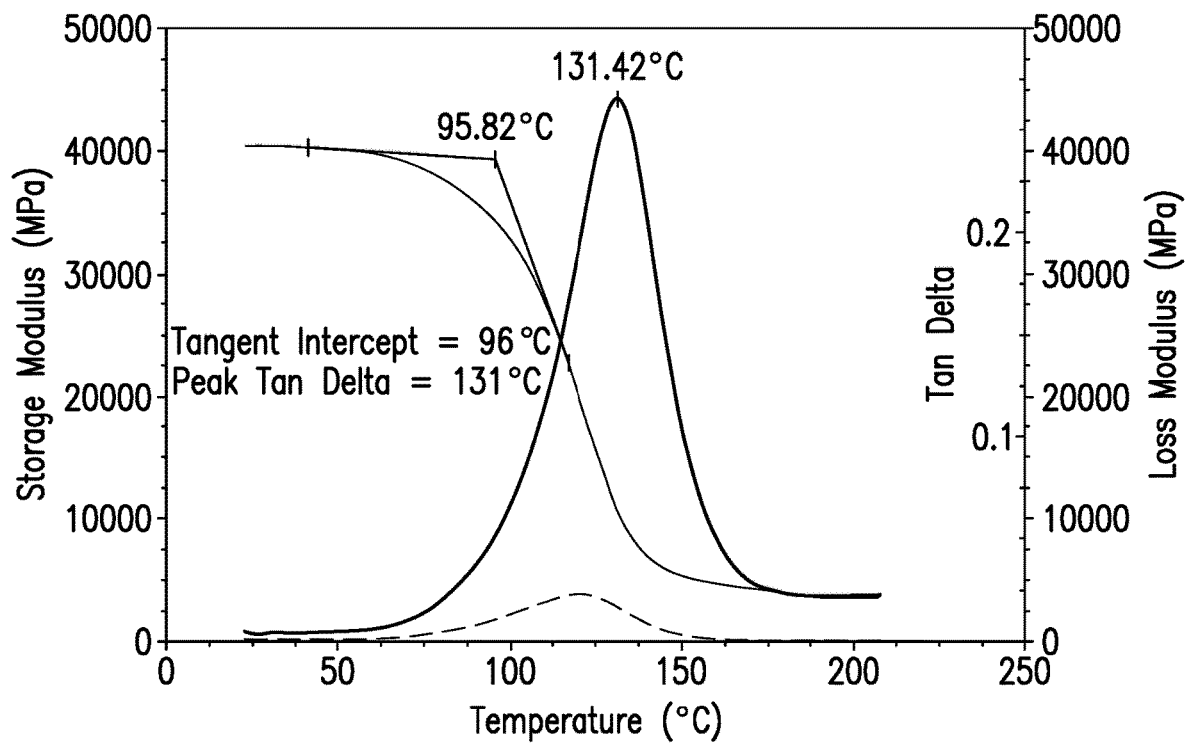

The epoxy resin formulation of Comparative Example 1 was used to prepare a pre-preg with the same 660 gsm 12k carbon fibre fabric as that used in example 3. The pre-preg had a resin content of 38%. This prepreg was used to make a 3-ply laminate which was then subjected to a 5 minute cure at 150° C. The curing was performed in a steel-matched die tool pre-heated to the curing temperature. The resulting laminate was tested by DMA following ASTM 7028-07, and found to exhibit a Tg of about 96° C. (see FIG. 15).

The Tg values of the cured pre-pregs of Examples 2 and 3 exhibit a difference of less than 3° C., demonstrating that the resin formulations of the present invention exhibit excellent Tg development regardless of the type of fibrous reinforcement. In particular, there is very little reduction in Tg when the pre-preg comprises a heavy "industrial-grade" fabric. In contrast, the Tg value of the cured pre-preg of Comparative Example 2 exhibits a Tg reduction of 13° C. with the heavier "industrial-grade" fabric, relative to the lighter fabric of Comparative Example 1, demonstrating the inferior Tg development resulting from curative filtration. As noted hereinabove, it is important to ensure the proper development of Tg in the curing process. An inferior Tg is disadvantageous because it limits the suitability of the moulded article in applications where the article is expected to work at elevated temperatures; and also increases the likelihood that the moulded part becomes distorted when removing it from the hot mould.

Comparative Example 3

Table 9 below describes a resin formulation exemplified as "composition 7" in EP-1279688-B1.

TABLE 9

| | Composition 7 |
|---|---|
| Epoxy resin A (EEW = 176) parts | 76.4 |
| Epoxy resin B (EEW = 1200-1400) parts | 23.6 |
| PVF$^a$ parts | 3.4 |
| DICY parts | 5.0 |
| OMICURE® U-24$^b$ parts | 4.2 |
| Total parts | 112.6 |
| Gel time (min.) at 130° C. | 3.9 |

$^a$Thermoplastic PVF powder (Vinylek™ type K)
$^b$OMICURE® U-24 is 2,4-toluene bis dimethyl urea The composition 7 of EP-1279688-B1 was reworked as faithfully as possible using the following replacement commercially available components:

Araldite® LY1556 was used as a direct alternative to Epon®828 for Epoxy resin A

A blend of Bisphenol-A epoxy resins Araldite® GT6099 (average EEW=2631) and Araldite® GT7071 (average EEW=512) were blended at a ratio of 3:1 to give an the desired EEW to be used as an alternative to Epoxy resin B.

Dyhard® DF50EP was used to provide the required loading of dicyandiamide (dicy) which is carried in bisphenol-A type epoxy resin at a concentration of 50%.

Omicure U24 as listed

Figure 16:
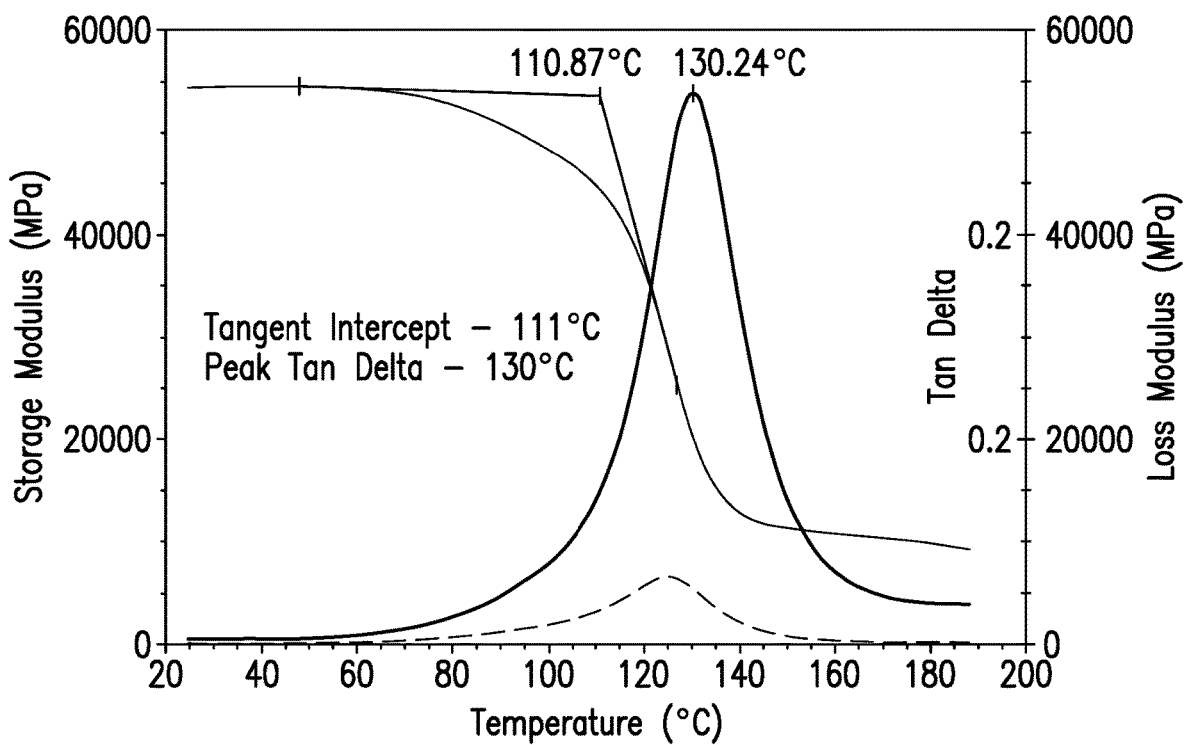

A prepreg was prepared from this epoxy resin formulation along using the same 200 gsm 3k carbon fibre fabric as that used in Example 2. The prepreg had a resin content of 38%. This prepreg was used to make a 10 ply laminate which was then subjected to a 3 minute cure at 150° C. The curing was performed in a steel-matched die tool that was pre-heated to the curing temperature. The resulting laminate was tested by DMA following ASTM 7028-07 in the same way as Example 2, and found to exhibit a Tg of about 111° C. (see FIG. 16).

Comparative Example 4

Figure 17:
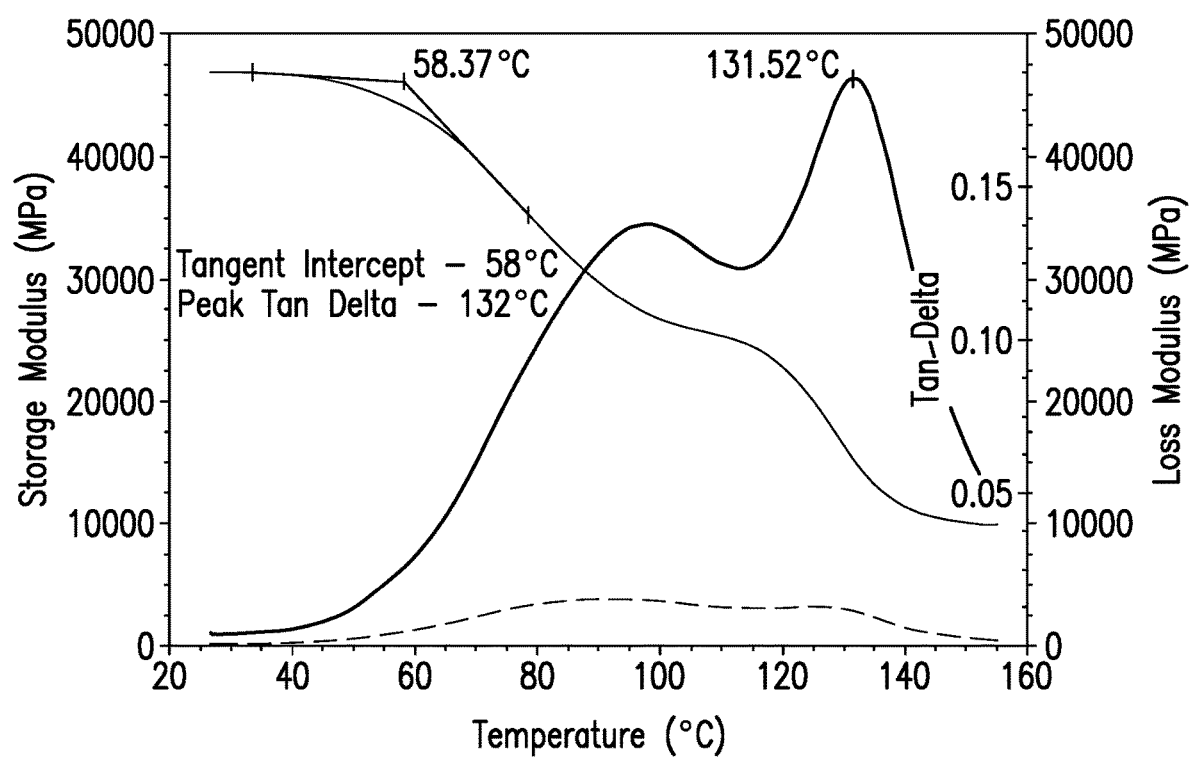

The epoxy resin formulation of Comparative Example 3 was used to prepare a pre-preg with the same 660 gsm 12k carbon fibre fabric as that used in Example 3. The pre-preg had a resin content of 38%. This prepreg was used to make a 3-ply laminate which was then subjected to a 3 minute cure at 150° C. The curing was performed in a steel-matched die tool pre-heated to the curing temperature. The resulting laminate was tested by DMA following ASTM 7028-07, and found to exhibit a Tg of about 58° C. (see FIG. 17).

As noted above, the Tg values of the cured pre-pregs of Examples 2 and 3 exhibit a difference of less than 3° C., demonstrating that the resin formulations of the present invention exhibit excellent Tg development regardless of the type of fibrous reinforcement. In particular, there is very little reduction in Tg when the pre-preg comprises a heavy "industrial-grade" fabric. In contrast, the Tg value of the cured pre-preg of Comparative Example 4 exhibits a Tg reduction of 53° C. with the heavier "industrial-grade" fabric, relative to the lighter fabric of Comparative Example 3, demonstrating the inferior Tg development resulting from curative filtration. As noted hereinabove, it is important to ensure the proper development of Tg in the curing process.

The invention claimed is:

1. A laminar pre-preg of fibre-reinforced curable composite material, wherein said pre-preg comprises at least one layer of reinforcing fibres impregnated with a curable resin comprising (i) one or more multifunctional epoxy resin(s) having a functionality of greater than two, (ii) one or more difunctional epoxy resin(s), (iii) at least one liquid curative, and (iv) a dicyandiamide in solid or particulate form, wherein:
- the at least one liquid curative is selected from substituted imidazoles, wherein the substituent groups of said substituted imidazoles are or comprise alkyl and/or aryl substituent groups;
- the reinforcing fibres are in the form of tows having a tow size of at least 12,000 filaments per tow and said layer of reinforcing fibres has an areal weight of at least 300 g/m$^2$;
- the curable resin exhibits a cure conversion of at least 95% when cured at a cure temperature in the range of from about 100° C. to about 160° C. wherein the cure cycle has a duration of no more than 10 minutes; and
- the glass transition temperature (Tg) of the curable resin when cured is in the range of from about 130° C. to about 165° C.

2. A pre-preg according to claim 1, wherein said liquid curative is selected from: 1-cyanoethyl-2-ethyl-4-methyl-imidazole, 2-ethyl-4-methylimidazole, 1-cyanoethyl-2-methylimidazole, 1-methyl imidazole, 4-methyl imidazole, 1-benzyl-2-phenylimidazole, 1-benzyl-2-methylimidazole, 1-(3-aminopropyl)imidazole, 1,2-dimethylimidazole, 1-cyanoethyl-2-undecylimidazole, and 4,5-bis[(2-cyanoethoxy)methyl]-2-phenyl-1H-imidazole-1-propiononitrile.

3. A pre-preg according to claim 1, wherein the substituted imidazole is present in the curable resin in an amount such that there is 1 mole of substituted imidazole per 10-25 moles of epoxy groups.

4. A pre-preg according to claim 1, wherein dicyandiamide is present in the curable resin in an amount of from about 1 wt % to about 20 wt %, based on the total weight of the curable resin.

5. A pre-preg according to claim 1, the one or more of difunctional epoxy resin(s) is/are selected from:
diglycidyl ether of bisphenol A; and
diglycidyl ether of bisphenol F.

6. A pre-preg according to claim 5, wherein the one or more multifunctional epoxy resin(s) is/are selected from:
triglycidyl aminophenol; and
tetraglycidyl diamino diphenyl methane (TGDDM).

7. A pre-preg according to claim 1, wherein the curable resin further comprises one or more organic polybasic acid(s) or organic polybasic acid anhydride(s).

8. A pre-preg according to claim 7 wherein the curable resin comprises 1 mole of liquid curative per 0.5 to 1.5 mole of acid group of the organic polybasic acid or anhydride.

9. A pre-preg according to claim 1, wherein said reinforcing fibres are carbon fibres.

10. A pre-preg according to claim 1, wherein the reinforcing fibres are glass fibres and exhibit a roving or yarn with a tex of at least 68.

11. A pre-preg according to claim 1, wherein the curable resin does not contain a cure inhibitor which is or comprises boric acid, a Lewis acid derivative of boron, a mineral acid having a nucleophilicity value (n) of greater than zero and less than 2.5, or an organic acid having a pKa value of from 1 to 3, or a mixture of two or more of said cure inhibitors.

12. A process for the production of a moulded article from a plurality of pre-pregs comprising the steps of:
(a) providing a mould;
(b) disposing a laminar pre-preg into or onto said mould;
(c) repeating step (b) at least once to dispose one or more further pre-pregs into or onto said mould; and
(d) curing the plurality of pre-pregs;
wherein said laminar pre-preg is a fibre-reinforced curable composite material as defined in claim 1.

13. A process according to claim 12, wherein curing is effected while the pre-pregs are compressed in a mould cavity.

14. A process according to claim 12 wherein curing is conducted at a cure temperature in the range of from about 100° C. to about 160° C., and wherein the plurality of pre-pregs is held at said cure temperature for a duration of no more than 10 minutes.

* * * * *